(12) United States Patent
Ampolini et al.

(10) Patent No.: US 10,888,119 B2
(45) Date of Patent: Jan. 12, 2021

(54) SYSTEM AND RELATED METHODS, APPARATUSES, AND COMPUTER PROGRAM PRODUCTS FOR CONTROLLING OPERATION OF A DEVICE BASED ON A READ REQUEST

(71) Applicant: R.J. Reynolds Tobacco Company, Winston-Salem, NC (US)

(72) Inventors: Frederic Philippe Ampolini, Winston-Salem, NC (US); Raymond Charles Henry, Jr., Cary, NC (US); Glen Kimsey, Cary, NC (US); Wilson Christopher Lamb, Hillsborough, NC (US)

(73) Assignee: RAI Strategic Holdings, Inc., Winston-Salem, NC (US)

( * ) Notice: Subject to any disclaimer, the term of this patent is extended or adjusted under 35 U.S.C. 154(b) by 1950 days.

(21) Appl. No.: 14/327,776

(22) Filed: Jul. 10, 2014

(65) Prior Publication Data
US 2016/0007651 A1   Jan. 14, 2016

(51) Int. Cl.
*A24F 47/00* (2020.01)
*H04M 1/725* (2006.01)
*H04L 29/08* (2006.01)

(52) U.S. Cl.
CPC ............ *A24F 47/008* (2013.01); *H04L 67/10* (2013.01); *H04M 1/7253* (2013.01)

(58) Field of Classification Search
CPC ..... A24F 47/008; H04L 67/10; H04M 1/7253
See application file for complete search history.

(56) References Cited

U.S. PATENT DOCUMENTS

| 1,771,366 A | 7/1930 | Wyss et al. |
| 2,057,353 A | 10/1936 | Whittemore, Jr. |

(Continued)

FOREIGN PATENT DOCUMENTS

| AU | 276250 | 7/1965 |
| CA | 2 641 869 | 5/2010 |

(Continued)

OTHER PUBLICATIONS

International Search Report and Written Opinion of the International Searching Authority for corresponding International Application No. PCT/US2015/038846 dated Sep. 28, 2015.

*Primary Examiner* — Tim T Vo
*Assistant Examiner* — Harry Z Wang
(74) *Attorney, Agent, or Firm* — Womble Bond Dickinson (US) LLP

(57) ABSTRACT

The present disclosure relates to a system and related methods, apparatuses, and computer program products for controlling operation of a device based on a read request. For example, a method for performing an operation in response to a read request may include a first computing device receiving a request to read a value sent to the first computing device by a second computing device via a wireless communication link between the first and second computing devices. The method may further include the first computing device determining an operation corresponding to the value. The method may additionally include the first computing device performing the operation corresponding to the value in response to the request.

32 Claims, 8 Drawing Sheets

(56) References Cited

U.S. PATENT DOCUMENTS

| | | |
|---|---|---|
| 2,104,266 A | 1/1938 | McCormick |
| 2,805,669 A | 9/1957 | Meriro |
| 3,200,819 A | 8/1965 | Gilbert |
| 3,316,919 A | 5/1967 | Green et al. |
| 3,398,754 A | 8/1968 | Tughan |
| 3,419,015 A | 12/1968 | Wochnowski |
| 3,424,171 A | 1/1969 | Rooker |
| 3,476,118 A | 11/1969 | Luttich |
| 4,054,145 A | 10/1977 | Berndt et al. |
| 4,131,117 A | 12/1978 | Kite et al. |
| 4,150,677 A | 4/1979 | Osborne |
| 4,190,046 A | 2/1980 | Virag |
| 4,219,032 A | 8/1980 | Tabatznik et al. |
| 4,259,970 A | 4/1981 | Green, Jr. |
| 4,284,089 A | 8/1981 | Ray |
| 4,303,083 A | 12/1981 | Burruss, Jr. |
| 4,449,541 A | 5/1984 | Mays et al. |
| 4,506,682 A | 3/1985 | Muller |
| 4,635,651 A | 1/1987 | Jacobs |
| 4,674,519 A | 6/1987 | Keritsis et al. |
| 4,708,151 A | 11/1987 | Shelar |
| 4,714,082 A | 12/1987 | Banerjee et al. |
| 4,735,217 A | 4/1988 | Gerth et al. |
| 4,756,318 A | 7/1988 | Clearman et al. |
| 4,771,795 A | 9/1988 | White et al. |
| 4,776,353 A | 10/1988 | Lilja et al. |
| 4,793,365 A | 12/1988 | Sensabaugh, Jr. et al. |
| 4,800,903 A | 1/1989 | Ray et al. |
| 4,819,665 A | 4/1989 | Roberts et al. |
| 4,821,749 A | 4/1989 | Toft et al. |
| 4,830,028 A | 5/1989 | Lawson et al. |
| 4,836,224 A | 6/1989 | Lawson et al. |
| 4,836,225 A | 6/1989 | Sudoh |
| 4,848,374 A | 7/1989 | Chard et al. |
| 4,848,376 A | 7/1989 | Lilja et al. |
| 4,874,000 A | 10/1989 | Tamol et al. |
| 4,880,018 A | 11/1989 | Graves, Jr. et al. |
| 4,887,619 A | 12/1989 | Burcham, Jr. et al. |
| 4,907,606 A | 3/1990 | Lilja et al. |
| 4,913,168 A | 4/1990 | Potter et al. |
| 4,917,119 A | 4/1990 | Potter et al. |
| 4,917,128 A | 4/1990 | Clearman et al. |
| 4,922,901 A | 5/1990 | Brooks et al. |
| 4,924,888 A | 5/1990 | Perfetti et al. |
| 4,928,714 A | 5/1990 | Shannon |
| 4,938,236 A | 7/1990 | Banerjee et al. |
| 4,941,483 A | 7/1990 | Ridings et al. |
| 4,941,484 A | 7/1990 | Clapp et al. |
| 4,945,931 A | 8/1990 | Gori |
| 4,947,874 A | 8/1990 | Brooks et al. |
| 4,947,875 A | 8/1990 | Brooks et al. |
| 4,972,854 A | 11/1990 | Kiernan et al. |
| 4,972,855 A | 11/1990 | Kuriyama et al. |
| 4,986,286 A | 1/1991 | Roberts et al. |
| 4,987,906 A | 1/1991 | Young et al. |
| 5,005,593 A | 4/1991 | Fagg |
| 5,019,122 A | 5/1991 | Clearman et al. |
| 5,022,416 A | 6/1991 | Watson |
| 5,042,510 A | 8/1991 | Curtiss et al. |
| 5,056,537 A | 10/1991 | Brown et al. |
| 5,060,669 A | 10/1991 | White et al. |
| 5,060,671 A | 10/1991 | Counts et al. |
| 5,065,775 A | 11/1991 | Fagg |
| 5,072,744 A | 12/1991 | Luke et al. |
| 5,074,319 A | 12/1991 | White et al. |
| 5,076,296 A | 12/1991 | Nystrom et al. |
| 5,093,894 A | 3/1992 | Deevi et al. |
| 5,095,921 A | 3/1992 | Losee et al. |
| 5,097,850 A | 3/1992 | Braunshteyn et al. |
| 5,099,862 A | 3/1992 | White et al. |
| 5,099,864 A | 3/1992 | Young et al. |
| 5,103,842 A | 4/1992 | Strang et al. |
| 5,121,757 A | 6/1992 | White et al. |
| 5,129,409 A | 7/1992 | White et al. |
| 5,131,415 A | 7/1992 | Munoz et al. |
| 5,144,962 A | 8/1992 | Counts et al. |
| 5,143,097 A | 9/1992 | Sohn et al. |
| 5,146,934 A | 9/1992 | Deevi et al. |
| 5,159,940 A | 11/1992 | Hayward et al. |
| 5,159,942 A | 11/1992 | Brinkley et al. |
| 5,179,966 A | 1/1993 | Losee et al. |
| 5,211,684 A | 5/1993 | Shannon et al. |
| 5,220,930 A | 6/1993 | Gentry |
| 5,224,498 A | 7/1993 | Deevi et al. |
| 5,228,460 A | 7/1993 | Sprinkel, Jr. et al. |
| 5,230,354 A | 7/1993 | Smith et al. |
| 5,235,992 A | 8/1993 | Sensabaugh |
| 5,243,999 A | 9/1993 | Smith |
| 5,246,018 A | 9/1993 | Deevi et al. |
| 5,249,586 A | 10/1993 | Morgan et al. |
| 5,261,424 A | 11/1993 | Sprinkel, Jr. |
| 5,269,327 A | 12/1993 | Counts et al. |
| 5,285,798 A | 2/1994 | Banerjee et al. |
| 5,293,883 A | 3/1994 | Edwards |
| 5,301,694 A | 4/1994 | Raymond |
| 5,303,720 A | 4/1994 | Banerjee et al. |
| 5,318,050 A | 6/1994 | Gonzalez-Parra et al. |
| 5,322,075 A | 6/1994 | Deevi et al. |
| 5,322,076 A | 6/1994 | Brinkley et al. |
| 5,339,838 A | 8/1994 | Young et al. |
| 5,345,951 A | 9/1994 | Serrano et al. |
| 5,353,813 A | 10/1994 | Deevi et al. |
| 5,357,984 A | 10/1994 | Farrier et al. |
| 5,360,023 A | 11/1994 | Blakley et al. |
| 5,369,723 A | 11/1994 | Counts et al. |
| 5,372,148 A | 12/1994 | McCafferty et al. |
| 5,377,698 A | 1/1995 | Litzinger et al. |
| 5,388,574 A | 2/1995 | Ingebrethsen et al. |
| 5,388,594 A | 2/1995 | Counts et al. |
| 5,408,574 A | 4/1995 | Deevi et al. |
| 5,435,325 A | 7/1995 | Clapp et al. |
| 5,445,169 A | 8/1995 | Brinkley et al. |
| 5,468,266 A | 11/1995 | Bensalem et al. |
| 5,468,936 A | 11/1995 | Deevi et al. |
| 5,479,948 A | 1/1996 | Counts et al. |
| 5,498,850 A | 3/1996 | Das |
| 5,498,855 A | 3/1996 | Deevi et al. |
| 5,499,636 A | 3/1996 | Baggett, Jr. et al. |
| 5,501,237 A | 3/1996 | Young et al. |
| 5,505,214 A | 4/1996 | Collins et al. |
| 5,515,842 A | 5/1996 | Ramseyer et al. |
| 5,530,225 A | 6/1996 | Hajaligol |
| 5,551,450 A | 9/1996 | Hemsley |
| 5,551,451 A | 9/1996 | Riggs et al. |
| 5,564,442 A | 10/1996 | MacDonald et al. |
| 5,573,692 A | 11/1996 | Das et al. |
| 5,591,368 A | 1/1997 | Fleischhauer et al. |
| 5,593,792 A | 1/1997 | Farrier et al. |
| 5,595,577 A | 1/1997 | Bensalem et al. |
| 5,596,706 A | 1/1997 | Sikk et al. |
| 5,611,360 A | 3/1997 | Tang |
| 5,613,504 A | 3/1997 | Collins et al. |
| 5,613,505 A | 3/1997 | Campbell et al. |
| 5,649,552 A | 7/1997 | Cho et al. |
| 5,649,554 A | 7/1997 | Sprinkel et al. |
| 5,659,656 A | 8/1997 | Das |
| 5,665,262 A | 9/1997 | Hajaligol et al. |
| 5,666,976 A | 9/1997 | Adams et al. |
| 5,666,977 A | 9/1997 | Higgins et al. |
| 5,666,978 A | 9/1997 | Counts et al. |
| 5,687,746 A | 11/1997 | Rose et al. |
| 5,692,525 A | 12/1997 | Counts et al. |
| 5,692,526 A | 12/1997 | Adams et al. |
| 5,708,258 A | 1/1998 | Counts et al. |
| 5,711,320 A | 1/1998 | Martin |
| 5,726,421 A | 3/1998 | Fleischhauer et al. |
| 5,727,571 A | 3/1998 | Meiring et al. |
| 5,730,158 A | 3/1998 | Collins et al. |
| 5,750,964 A | 5/1998 | Counts et al. |
| 5,799,663 A | 9/1998 | Gross et al. |
| 5,816,263 A | 10/1998 | Counts et al. |
| 5,819,756 A | 10/1998 | Mielordt |
| 5,829,453 A | 11/1998 | White et al. |
| 5,865,185 A | 2/1999 | Collins et al. |

(56) References Cited

U.S. PATENT DOCUMENTS

| | | |
|---|---|---|
| 5,865,186 A | 2/1999 | Volsey, II |
| 5,878,752 A | 3/1999 | Adams et al. |
| 5,880,439 A | 3/1999 | Deevi et al. |
| 5,894,841 A | 4/1999 | Voges |
| 5,915,387 A | 7/1999 | Baggett, Jr. et al. |
| 5,934,289 A | 8/1999 | Watkins et al. |
| 5,954,979 A | 9/1999 | Counts et al. |
| 5,967,148 A | 10/1999 | Harris et al. |
| 6,026,820 A | 2/2000 | Baggett, Jr. et al. |
| 6,033,623 A | 3/2000 | Deevi et al. |
| 6,040,560 A | 3/2000 | Fleischhauer et al. |
| 6,053,176 A | 4/2000 | Adams et al. |
| 6,089,857 A | 7/2000 | Matsuura et al. |
| 6,095,153 A | 8/2000 | Kessler et al. |
| 6,116,247 A | 9/2000 | Banyasz et al. |
| 6,119,700 A | 9/2000 | Fleischhauer et al. |
| 6,125,853 A | 10/2000 | Susa et al. |
| 6,125,855 A | 10/2000 | Nevett et al. |
| 6,125,866 A | 10/2000 | Nichols et al. |
| 6,155,268 A | 12/2000 | Takeuchi |
| 6,164,287 A | 12/2000 | White |
| 6,182,670 B1 | 2/2001 | White |
| 6,196,218 B1 | 3/2001 | Voges |
| 6,196,219 B1 | 3/2001 | Hess et al. |
| 6,216,706 B1 | 4/2001 | Kumar et al. |
| 6,289,898 B1 | 9/2001 | Fournier et al. |
| 6,349,729 B1 | 2/2002 | Pham |
| 6,357,671 B1 | 3/2002 | Cewers |
| 6,418,938 B1 | 7/2002 | Fleischhauer et al. |
| 6,446,426 B1 | 8/2002 | Sweeney et al. |
| 6,532,965 B1 | 3/2003 | Abhulimen et al. |
| 6,598,607 B2 | 7/2003 | Adiga et al. |
| 6,601,776 B1 | 8/2003 | Oljaca et al. |
| 6,615,840 B1 | 9/2003 | Fournier et al. |
| 6,688,313 B2 | 2/2004 | Wrenn et al. |
| 6,701,936 B2 | 3/2004 | Shafer et al. |
| 6,715,494 B1 | 4/2004 | McCoy |
| 6,730,832 B1 | 5/2004 | Dominguez et al. |
| 6,772,756 B2 | 8/2004 | Shayan |
| 6,803,545 B2 | 10/2004 | Blake et al. |
| 6,803,550 B2 | 10/2004 | Sharpe et al. |
| 6,810,883 B2 | 11/2004 | Felter et al. |
| 6,854,461 B2 | 2/2005 | Nichols |
| 6,854,470 B1 | 2/2005 | Pu |
| 6,994,096 B2 | 2/2006 | Rostami et al. |
| 7,011,096 B2 | 3/2006 | Li et al. |
| 7,017,585 B2 | 3/2006 | Li et al. |
| 7,025,066 B2 | 4/2006 | Lawson et al. |
| 7,117,867 B2 | 10/2006 | Cox et al. |
| 7,163,015 B2 | 1/2007 | Moffitt |
| 7,173,322 B2 | 2/2007 | Cox et al. |
| 7,185,659 B2 | 3/2007 | Sharpe et al. |
| 7,234,470 B2 | 6/2007 | Yang |
| 7,290,549 B2 | 11/2007 | Banerjee et al. |
| 7,293,565 B2 | 11/2007 | Griffin et al. |
| 7,392,809 B2 | 7/2008 | Larson et al. |
| 7,513,253 B2 | 4/2009 | Kobayashi et al. |
| 7,647,932 B2 | 1/2010 | Cantrell et al. |
| 7,690,385 B2 | 4/2010 | Moffitt |
| 7,692,123 B2 | 4/2010 | Baba et al. |
| 7,726,320 B2 | 6/2010 | Robinson et al. |
| 7,775,459 B2 | 8/2010 | Martens, III et al. |
| 7,810,505 B2 | 10/2010 | Yang |
| 7,832,410 B2 | 11/2010 | Hon |
| 7,845,359 B2 | 12/2010 | Montaser |
| 7,878,209 B2 | 2/2011 | Newbery et al. |
| 7,896,006 B2 | 3/2011 | Hamano et al. |
| 8,066,010 B2 | 11/2011 | Newbery et al. |
| 8,079,371 B2 | 12/2011 | Robinson et al. |
| 8,127,772 B2 | 3/2012 | Montaser |
| 8,156,944 B2 | 4/2012 | Han |
| 8,314,591 B2 | 11/2012 | Terry et al. |
| 8,365,742 B2 | 2/2013 | Hon |
| 8,375,957 B2 | 2/2013 | Hon |
| 8,393,331 B2 | 3/2013 | Hon |
| 8,402,976 B2 | 3/2013 | Fernando et al. |
| 8,499,766 B1 | 8/2013 | Newton |
| 8,528,569 B1 | 9/2013 | Newton |
| 8,550,069 B2 | 10/2013 | Alelov |
| 8,851,081 B2 * | 10/2014 | Fernando .............. A24F 47/008 131/194 |
| 2002/0146242 A1 | 10/2002 | Vieira |
| 2003/0131859 A1 | 7/2003 | Li et al. |
| 2003/0226837 A1 | 12/2003 | Blake et al. |
| 2004/0020500 A1 | 2/2004 | Wrenn et al. |
| 2004/0050383 A1 | 3/2004 | Cox et al. |
| 2004/0118401 A1 | 6/2004 | Smith et al. |
| 2004/0129280 A1 | 7/2004 | Woodson et al. |
| 2004/0149296 A1 | 8/2004 | Rostami et al. |
| 2004/0200488 A1 | 10/2004 | Felter et al. |
| 2004/0226568 A1 | 11/2004 | Takeuchi et al. |
| 2004/0255965 A1 | 12/2004 | Perfetti et al. |
| 2005/0016549 A1 | 1/2005 | Banerjee et al. |
| 2005/0016550 A1 | 1/2005 | Katase |
| 2005/0066986 A1 | 3/2005 | Nestor et al. |
| 2005/0172976 A1 | 8/2005 | Newman et al. |
| 2005/0274390 A1 | 12/2005 | Banerjee et al. |
| 2006/0016453 A1 | 1/2006 | Kim |
| 2006/0070633 A1 | 4/2006 | Rostami et al. |
| 2006/0162733 A1 | 7/2006 | McGrath et al. |
| 2006/0185687 A1 | 8/2006 | Hearn et al. |
| 2006/0196518 A1 | 9/2006 | Hon |
| 2007/0074734 A1 | 4/2007 | Braunshteyn et al. |
| 2007/0102013 A1 | 5/2007 | Adams et al. |
| 2007/0215167 A1 | 9/2007 | Crooks et al. |
| 2007/0283972 A1 | 12/2007 | Monsees et al. |
| 2008/0085103 A1 | 4/2008 | Beland et al. |
| 2008/0092912 A1 | 4/2008 | Robinson et al. |
| 2008/0149118 A1 | 6/2008 | Oglesby et al. |
| 2008/0245377 A1 | 10/2008 | Marshall et al. |
| 2008/0257367 A1 | 10/2008 | Paterno et al. |
| 2008/0276947 A1 | 11/2008 | Martzel |
| 2008/0302374 A1 | 12/2008 | Wengert et al. |
| 2009/0065010 A1 | 3/2009 | Shands |
| 2009/0095311 A1 | 4/2009 | Han |
| 2009/0095312 A1 | 4/2009 | Herbrich et al. |
| 2009/0126745 A1 | 5/2009 | Hon |
| 2009/0128301 A1 | 5/2009 | Park et al. |
| 2009/0188490 A1 | 7/2009 | Han |
| 2009/0230117 A1 | 9/2009 | Fernando et al. |
| 2009/0260641 A1 | 10/2009 | Monsees et al. |
| 2009/0260642 A1 | 10/2009 | Monsees et al. |
| 2009/0272379 A1 | 11/2009 | Thorens et al. |
| 2009/0283103 A1 | 11/2009 | Nielsen et al. |
| 2009/0293892 A1 | 12/2009 | Williams et al. |
| 2009/0324206 A1 | 12/2009 | Young et al. |
| 2010/0006113 A1 | 1/2010 | Urtsev et al. |
| 2010/0023582 A1 | 1/2010 | Pedersen et al. |
| 2010/0024834 A1 | 2/2010 | Oglesby et al. |
| 2010/0043809 A1 | 2/2010 | Magnon |
| 2010/0059070 A1 | 3/2010 | Potter et al. |
| 2010/0059073 A1 | 3/2010 | Hoffmann et al. |
| 2010/0065075 A1 | 3/2010 | Banerjee et al. |
| 2010/0083959 A1 | 4/2010 | Siller |
| 2010/0163063 A1 | 7/2010 | Fernando et al. |
| 2010/0200006 A1 | 8/2010 | Robinson et al. |
| 2010/0229881 A1 | 9/2010 | Hearn |
| 2010/0242974 A1 | 9/2010 | Pan |
| 2010/0242976 A1 | 9/2010 | Katayama et al. |
| 2010/0258139 A1 | 10/2010 | Onishi et al. |
| 2010/0300467 A1 | 12/2010 | Kuistilla et al. |
| 2010/0307518 A1 | 12/2010 | Wang |
| 2010/0313901 A1 | 12/2010 | Fernando et al. |
| 2011/0005535 A1 | 1/2011 | Xiu |
| 2011/0011396 A1 | 1/2011 | Fang |
| 2011/0036363 A1 | 2/2011 | Urtsev et al. |
| 2011/0036365 A1 | 2/2011 | Chong et al. |
| 2011/0073121 A1 | 3/2011 | Levin et al. |
| 2011/0088707 A1 | 4/2011 | Hajaligol |
| 2011/0094523 A1 | 4/2011 | Thorens et al. |
| 2011/0120480 A1 | 5/2011 | Brenneise |
| 2011/0126847 A1 | 6/2011 | Zuber et al. |
| 2011/0126848 A1 | 6/2011 | Zuber et al. |
| 2011/0155153 A1 | 6/2011 | Thorens et al. |

(56) References Cited

U.S. PATENT DOCUMENTS

| | | |
|---|---|---|
| 2011/0155718 A1 | 6/2011 | Greim et al. |
| 2011/0162663 A1 | 7/2011 | Bryman |
| 2011/0168194 A1 | 7/2011 | Hon |
| 2011/0180082 A1 | 7/2011 | Banerjee et al. |
| 2011/0265806 A1 | 11/2011 | Alarcon et al. |
| 2011/0309157 A1 | 12/2011 | Yang et al. |
| 2012/0042885 A1 | 2/2012 | Stone et al. |
| 2012/0060853 A1 | 3/2012 | Robinson et al. |
| 2012/0111347 A1 | 5/2012 | Hon |
| 2012/0132643 A1 | 5/2012 | Choi et al. |
| 2012/0227752 A1 | 9/2012 | Alelov |
| 2012/0231464 A1 | 9/2012 | Yu et al. |
| 2012/0260927 A1 | 10/2012 | Liu |
| 2012/0279512 A1 | 11/2012 | Hon |
| 2012/0318882 A1 | 12/2012 | Abehasera |
| 2013/0037041 A1 | 2/2013 | Worm et al. |
| 2013/0056013 A1 | 3/2013 | Terry et al. |
| 2013/0081625 A1 | 4/2013 | Rustad et al. |
| 2013/0081642 A1 | 4/2013 | Safari |
| 2013/0192619 A1 | 8/2013 | Tucker et al. |
| 2013/0206154 A1 | 8/2013 | Fernando et al. |
| 2013/0306084 A1 | 11/2013 | Flick |
| 2013/0319439 A1 | 12/2013 | Gorelick et al. |
| 2013/0340750 A1 | 12/2013 | Thorens et al. |
| 2013/0340775 A1 | 12/2013 | Juster et al. |
| 2014/0060554 A1 | 3/2014 | Collett et al. |
| 2014/0060555 A1 | 3/2014 | Chang et al. |
| 2014/0096781 A1 | 4/2014 | Sears et al. |
| 2014/0096782 A1 | 4/2014 | Ampolini et al. |
| 2014/0202477 A1 | 7/2014 | Qi et al. |
| 2014/0278139 A1* | 9/2014 | Hong .............. A61B 5/4866 702/19 |
| 2015/0007838 A1 | 1/2015 | Fernando et al. |

FOREIGN PATENT DOCUMENTS

| | | |
|---|---|---|
| CA | 2 752 255 | 8/2010 |
| CN | 1541577 | 11/2004 |
| CN | 2719043 | 8/2005 |
| CN | 200997909 | 1/2008 |
| CN | 101116542 | 2/2008 |
| CN | 101176805 | 5/2008 |
| CN | 201379072 | 1/2010 |
| CN | 103914013 A | 7/2014 |
| DE | 10 2006 004 484 | 8/2007 |
| DE | 102006041042 | 3/2008 |
| DE | 20 2009 010 400 | 11/2009 |
| EP | 0 295 122 | 12/1988 |
| EP | 0 430 566 | 6/1991 |
| EP | 0 845 220 | 6/1998 |
| EP | 1 618 803 | 1/2006 |
| EP | 2 110 034 | 10/2009 |
| EP | 2 316 286 | 5/2011 |
| EP | 2 468 116 | 6/2012 |
| GB | 1444461 | 7/1976 |
| GB | 2469850 | 11/2010 |
| JP | 2002-362730 A | 12/2002 |
| JP | 2006-217227 A | 8/2006 |
| JP | 2008-311958 A | 12/2008 |
| JP | 2011-517567 A | 6/2011 |
| KR | 20060042716 A | 5/2006 |
| WO | WO 1986/02528 | 5/1986 |
| WO | WO 1997/48293 | 12/1997 |
| WO | WO 02/37990 | 5/2002 |
| WO | WO 2004/043175 | 5/2004 |
| WO | WO 2005/099494 | 10/2005 |
| WO | WO 2007/078273 | 7/2007 |
| WO | WO 2007/131449 | 11/2007 |
| WO | WO 2009/105919 | 9/2009 |
| WO | WO 2009/155734 | 12/2009 |
| WO | WO 2010/003480 | 1/2010 |
| WO | WO 2010/045670 | 4/2010 |
| WO | WO 2010/073122 | 7/2010 |
| WO | WO 2010/091593 | 8/2010 |
| WO | WO 2010/118644 | 10/2010 |
| WO | 2010/133342 A1 | 11/2010 |
| WO | WO 2010/140937 | 12/2010 |
| WO | WO 2011/010334 | 1/2011 |
| WO | WO 2011/081558 | 7/2011 |
| WO | WO 2012/072762 | 6/2012 |
| WO | 2012/094400 A1 | 7/2012 |
| WO | WO 2012/100523 | 8/2012 |
| WO | WO 2013/089551 | 6/2013 |
| WO | 2013158352 A1 | 10/2013 |

* cited by examiner

SYSTEM AND RELATED METHODS, APPARATUSES, AND COMPUTER PROGRAM PRODUCTS FOR CONTROLLING OPERATION OF A DEVICE BASED ON A READ REQUEST

FIELD OF THE DISCLOSURE

The present disclosure relates to a first device controlling operation of a second device, and, more particularly, to a first device controlling operation of a second device based on a read request. Some embodiments may be applied to aerosol delivery devices, such as smoking articles, and more particularly to a system and elated methods and computer program products for controlling an aerosol delivery device by a read request. The smoking articles may be configured to heat a material, which may be made or derived from tobacco or otherwise incorporate tobacco, to form an inhalable substance for human consumption.

BACKGROUND

Many smoking devices have been proposed through the years as improvements upon, or alternatives to, smoking products that require combusting tobacco for use. Many of those devices purportedly have been designed to provide the sensations associated with cigarette, cigar, or pipe smoking, but without delivering considerable quantities of incomplete combustion and pyrolysis products that result from the burning of tobacco. To this end, there have been proposed numerous smoking products, flavor generators, and medicinal inhalers that utilize electrical energy to vaporize or heat a volatile material, or attempt to provide the sensations of cigarette, cigar, or pipe smoking without burning tobacco to a significant degree. See, for example, the various alternative smoking articles, aerosol delivery devices and heat generating sources set forth in the background art described in U.S. Pat. No. 7,726,320 to Robinson et al., U.S. Pat. App. Pub. No. 2013/0255702 to Griffith Jr. et al., U.S. Pat. App. Pub. No. 2014/0000638 to Sebastian et al., U.S. Pat. App. Pub. No. 2014/0060554 to Collett et al., U.S. patent application Ser. No. 13/647,000 to Sears et al., filed Oct. 8, 2012, U.S. patent application Ser. No. 13/826,929 to Ampolini et al., filed Mar. 14, 2013, and U.S. patent application Ser. No. 14/011,992 to Davis et al., filed Aug. 28, 2013, which are incorporated herein by reference in their entirety.

Ongoing developments in the field of aerosol delivery devices have resulted in increasingly sophisticated aerosol delivery devices. However, due to factors such as form factor, many aerosol delivery devices have relatively limited user interface mechanisms via which operations of the device may be invoked by a user.

SUMMARY OF THE DISCLOSURE

The present disclosure relates to a system and related methods, apparatuses, and computer program products for controlling operation of a device based on a read request. For example, various embodiments disclosed herein provide a system whereby a first computing device may invoke performance of an operation by a second computing device by sending a request to read a value corresponding to the operation to the second computing device via a communication link between the first computing device and the second computing device. In this regard, each of a plurality of readable values that may be maintained by the second computing device may correspond to a respective operation, and the second computing device may be configured to perform the operation corresponding to the value that the first computing device requested to read in response to the request. Such example embodiments may be particularly beneficial for devices, such as aerosol delivery devices, that may have relatively limited user interface mechanisms. For example, some such example embodiments may be applied to enable a device such as a mobile communication device having a full featured user interface to invoke performance of an operation by an aerosol delivery device by sending a request to read a value corresponding to the operation to the aerosol delivery device.

For example, in one aspect, a method for performing an operation in response to a read request is provided. The method may include a first computing device receiving a request to read a value. The request may be received from a second computing device via a wireless communication link between the first computing device and the second computing device. The first computing device may, for example, comprise an aerosol delivery device. The second computing device may, for example, comprise a mobile communication device. The method may further include the first computing device determining an operation corresponding to the value. In this regard, each of a plurality of values that may be read from the first computing device may correspond to a different respective operation. The method may additionally include the first computing device performing the operation corresponding to the value in response to the request.

In another aspect, an apparatus is provided, which may include processing circuitry. The apparatus may be implemented on a first computing device, such as an aerosol delivery device. The processing circuitry may be configured to cause the first computing device to receive a request to read a value. The request may be received from a second computing device, such as a mobile communication device, via a wireless communication link between the first computing device and the second computing device. The processing circuitry may be further configured to cause the first computing device to determine an operation corresponding to the value. In this regard, each of a plurality of values that may be read from the first computing device may correspond to a different respective operation. The processing circuitry may be additionally configured to cause the first computing device to perform the operation corresponding to the value in response to the request.

In a further aspect, a computer program product is provided, which may include at least one non-transitory computer-readable storage medium having program instructions stored thereon. The stored program instructions may include program code for receiving, to a first computing device, a request to read a value. The request may be received from a second computing device via a wireless communication link between the first computing device and the second computing device. The first computing device may, for example, comprise an aerosol delivery device. The second computing device may, for example, comprise a mobile communication device. The stored program instructions may further include program code for determining an operation corresponding to the value. In this regard, each of a plurality of values that may be read from the first computing device may correspond to a different respective operation. The stored program instructions may additionally include program code for controlling the first computing device to perform the operation corresponding to the value in response to the request.

In an additional aspect, a method for causing a computing device to perform an operation in response to a read request is provided. The method may include a first computing device determining an operation for performance by a second computing device. The first computing device may, for example, comprise a mobile communication device. The second computing device may, for example, comprise an aerosol delivery device. The method may further include the first computing device determining a value corresponding to the operation. In this regard, each of a plurality of values that may be read from the second computing device may correspond to a different respective operation. The method may additionally include the first computing device formatting a request to read the value corresponding to the operation and sending the request to the second computing device via a wireless communication link between the first computing device and the second computing device to cause the second computing device to perform the operation.

In still a further aspect, an apparatus is provided, which may include processing circuitry. The apparatus may be implemented on a first computing device, such as a mobile communication device. The processing circuitry may be configured to cause the first computing device to determine an operation for performance by a second computing device. The second computing device may, for example, comprise an aerosol delivery device. The processing circuitry may be further configured to cause the first computing device to determine a value corresponding to the operation. In this regard, each of a plurality of values that may be read from the second computing device may correspond to a different respective operation. The processing circuitry may be additionally configured to cause the first computing device to format a request to read the value corresponding to the operation and to send the request to the second computing device via a wireless communication link between the first computing device and the second computing device to cause the second computing device to perform the operation.

In another aspect, a computer program product is provided, which may include at least one non-transitory computer-readable storage medium having program instructions stored thereon. The stored program instructions may include program code for determining, at a first computing device, an operation for performance by a second computing device. The first computing device may, for example, comprise a mobile communication device. The second computing device may, for example, comprise an aerosol delivery device. The stored program instructions may further include program code for determining, at the first computing device, a value corresponding to the operation. In this regard, each of a plurality of values that may be read from the second computing device may correspond to a different respective operation. The stored program instructions may additionally include program code for formatting a request to read the value corresponding to the operation and sending the request to the second computing device via a wireless communication link between the first computing device and the second computing device to cause the second computing device to perform the operation.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. In this regard, these and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF THE FIGURES

Figure 1:
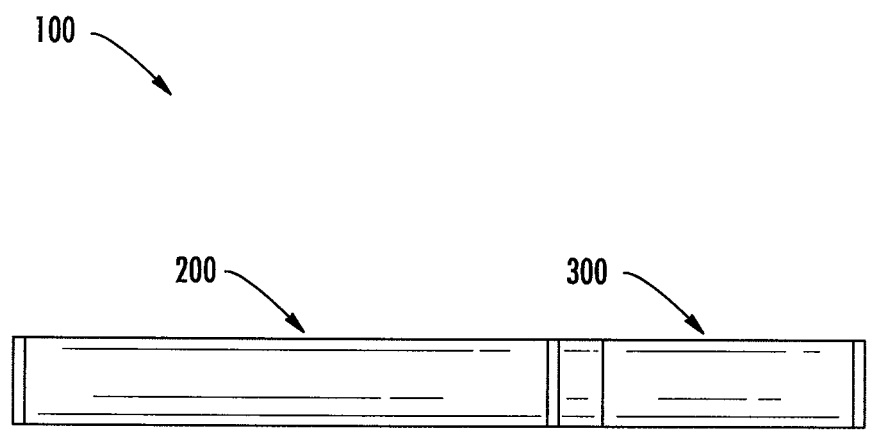
Figure 2:
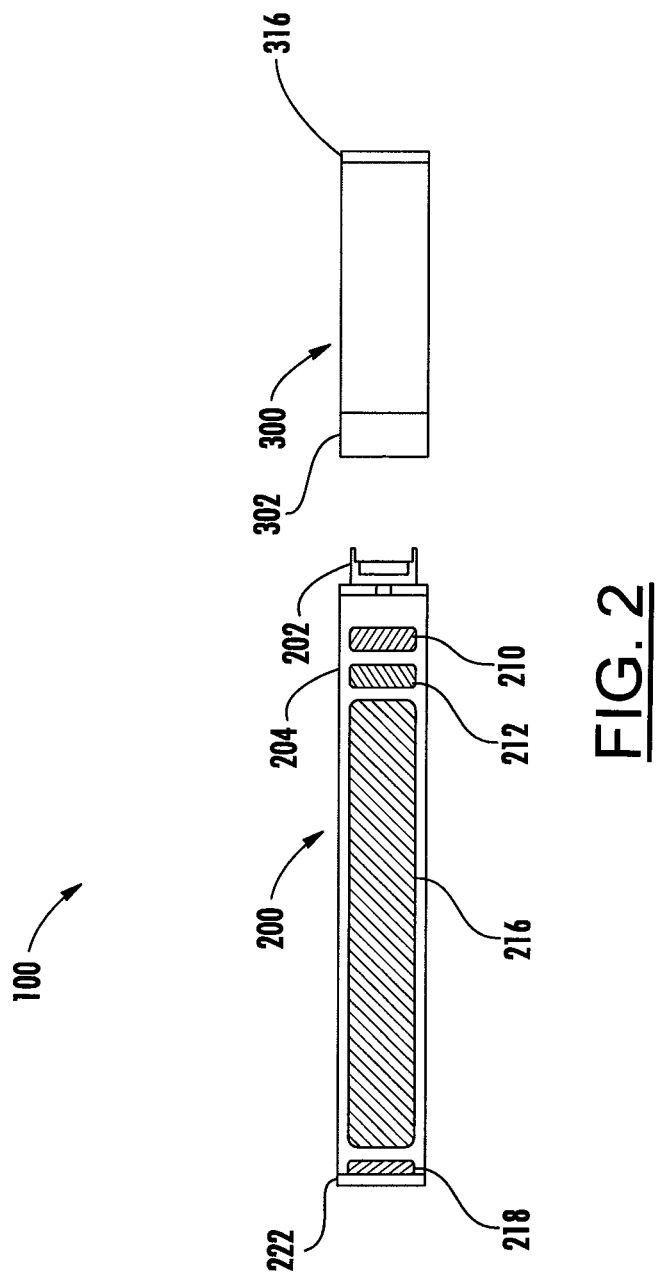
Figure 3:
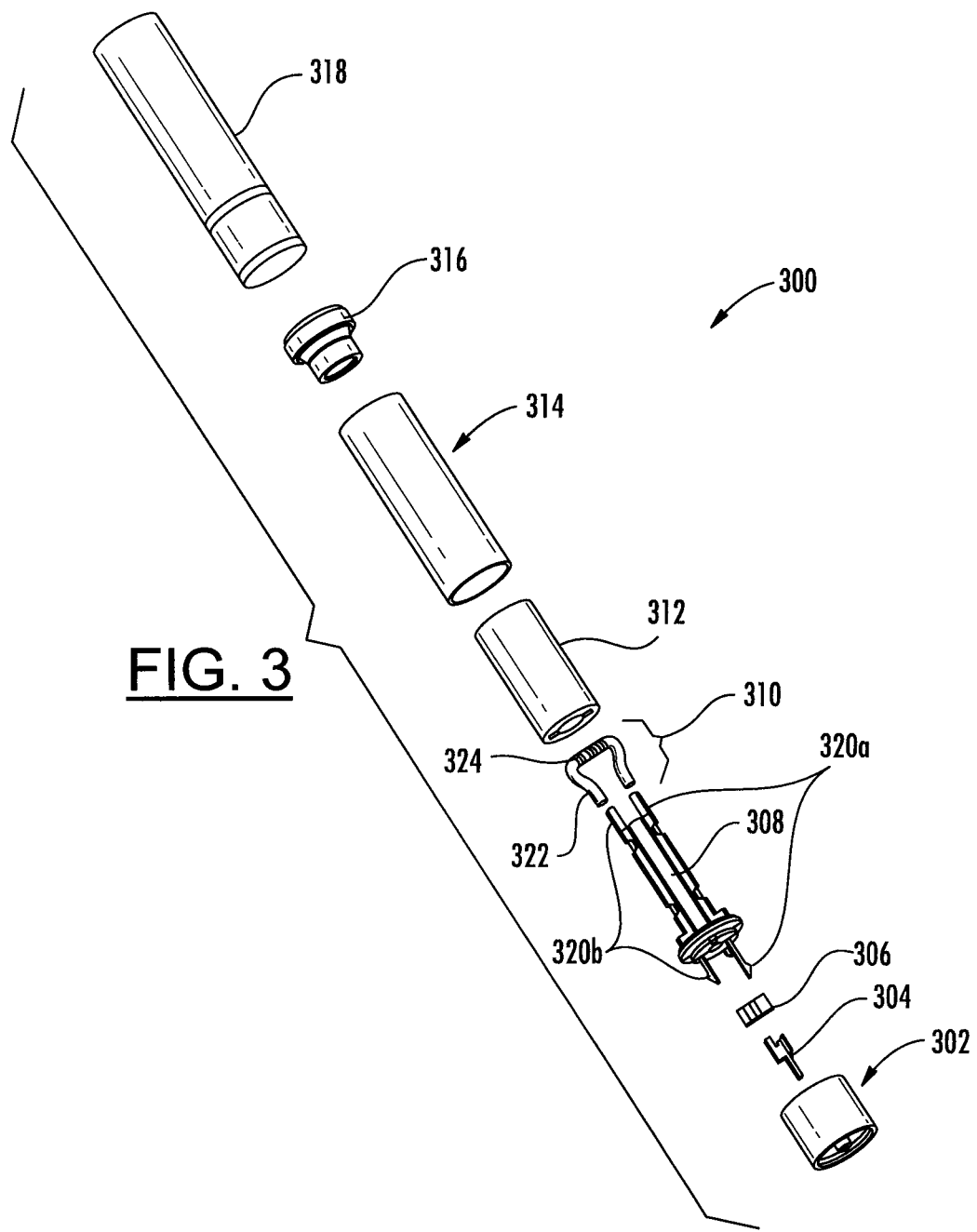
Figure 4:
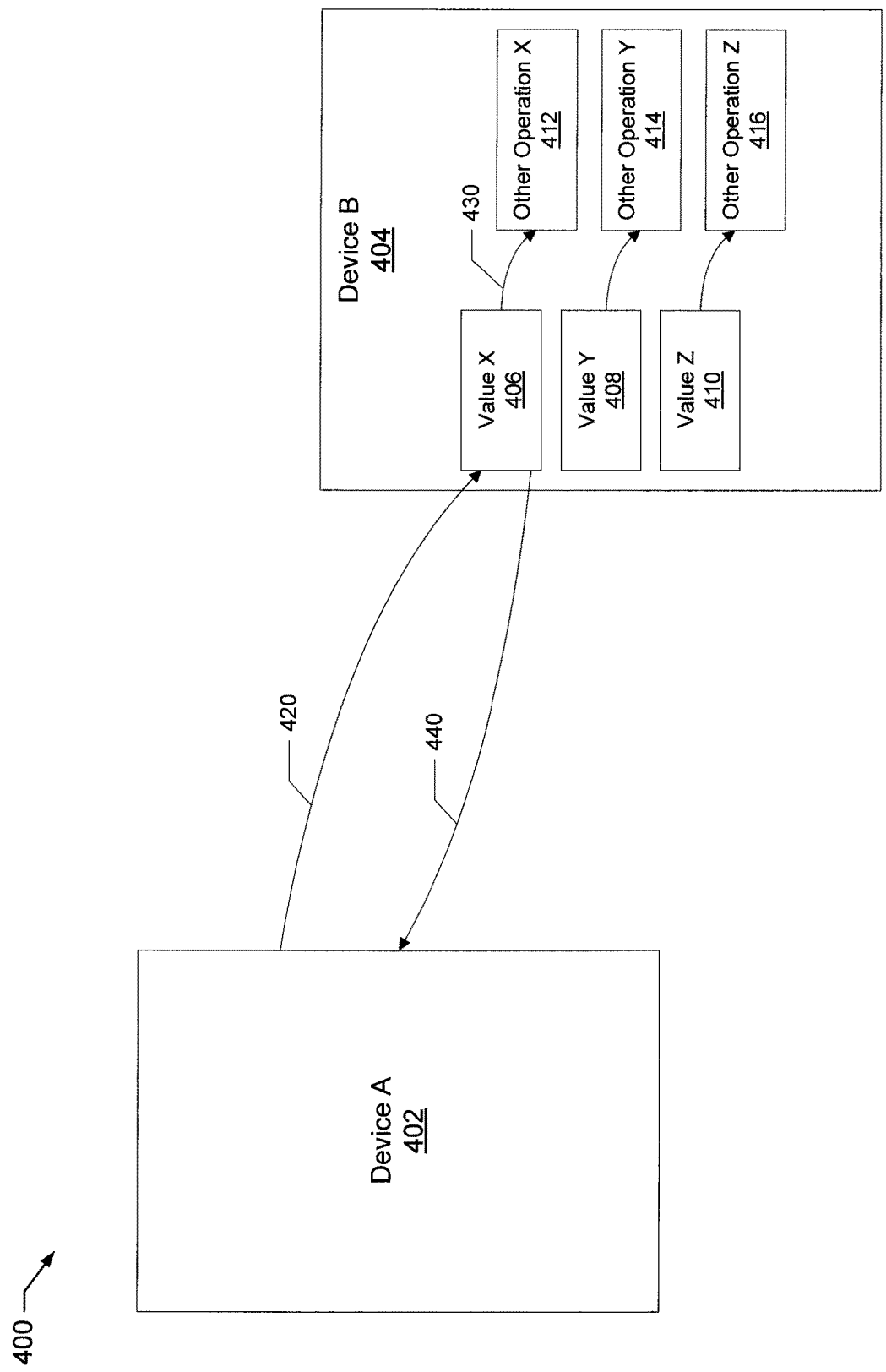
Figure 5:
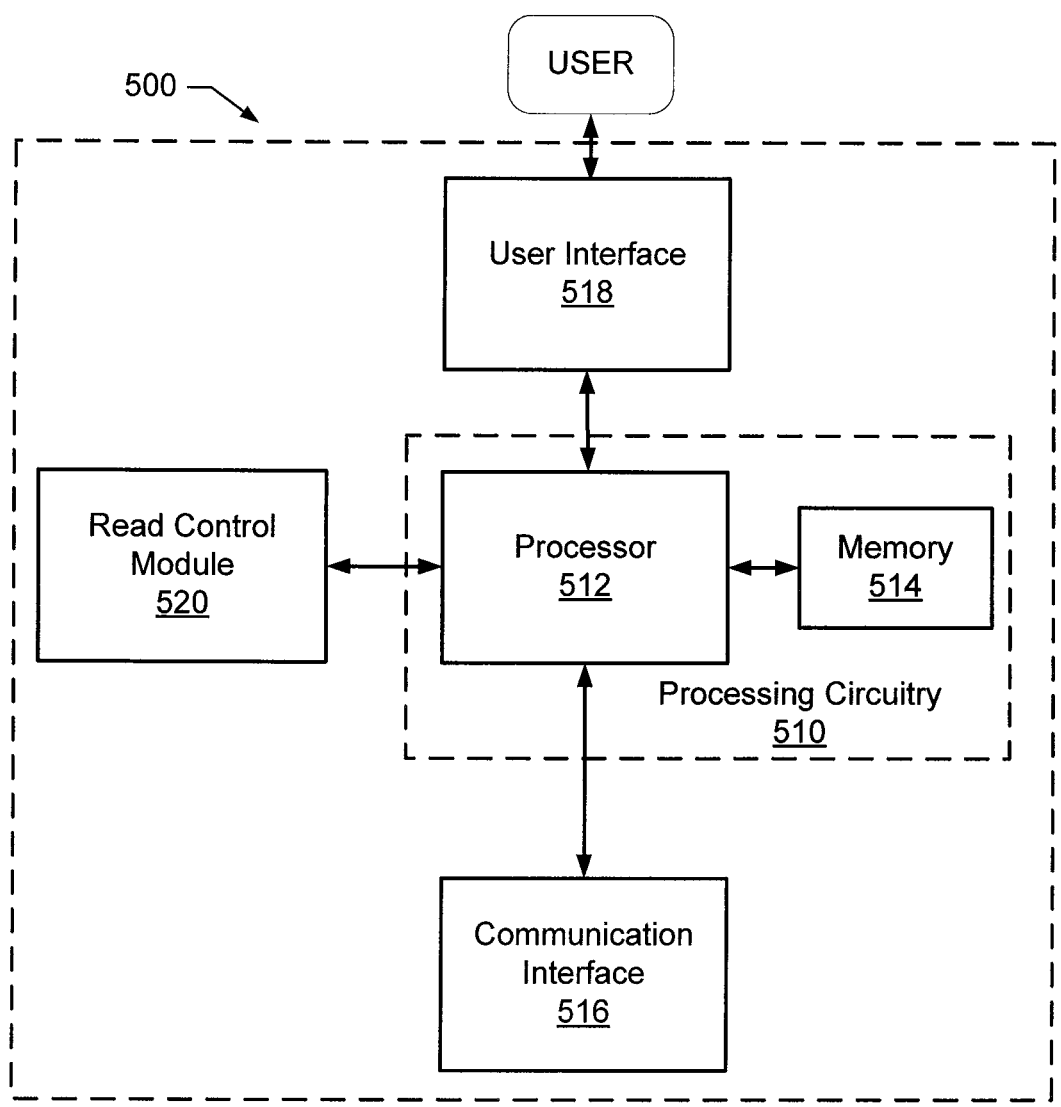
Figure 6:
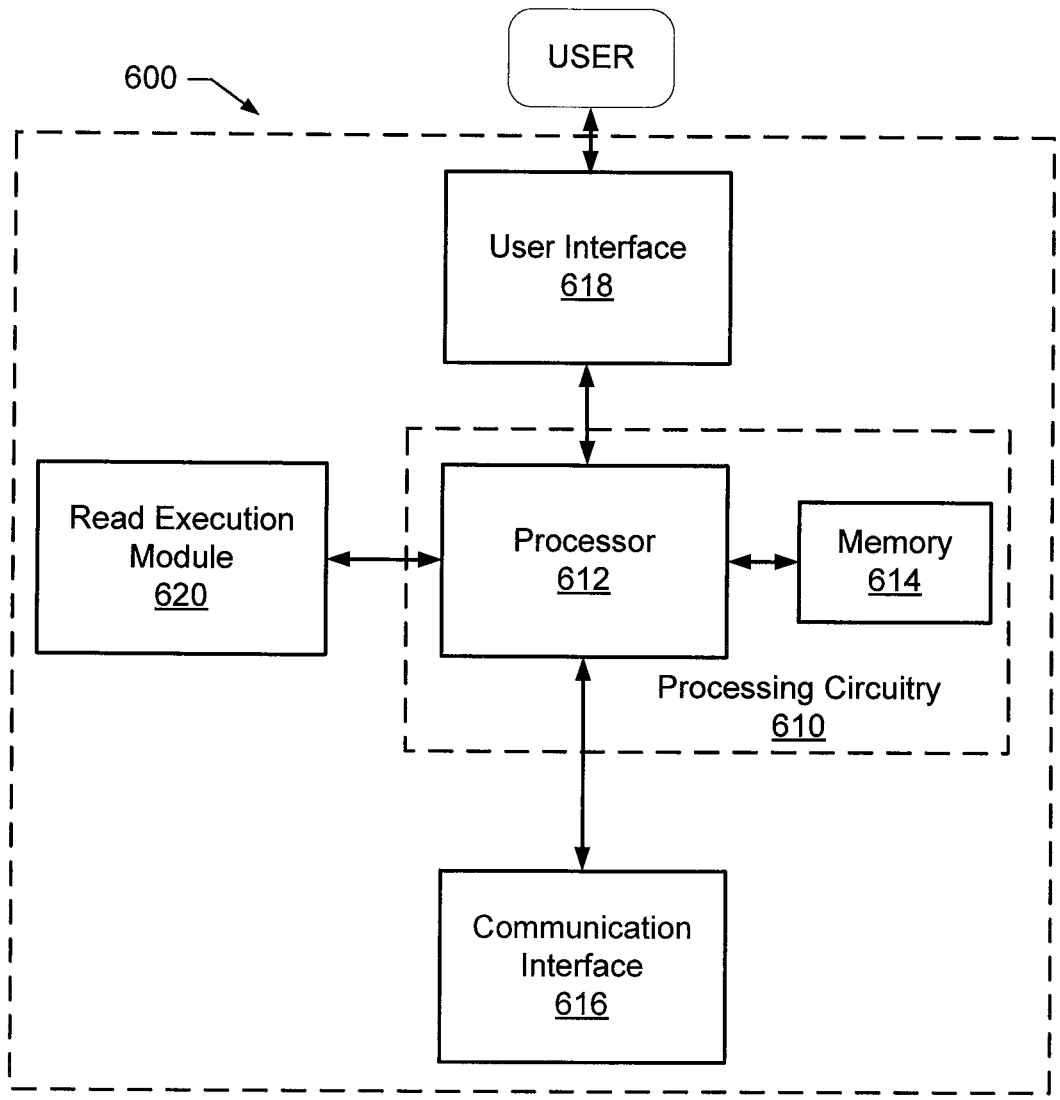
Figure 7:
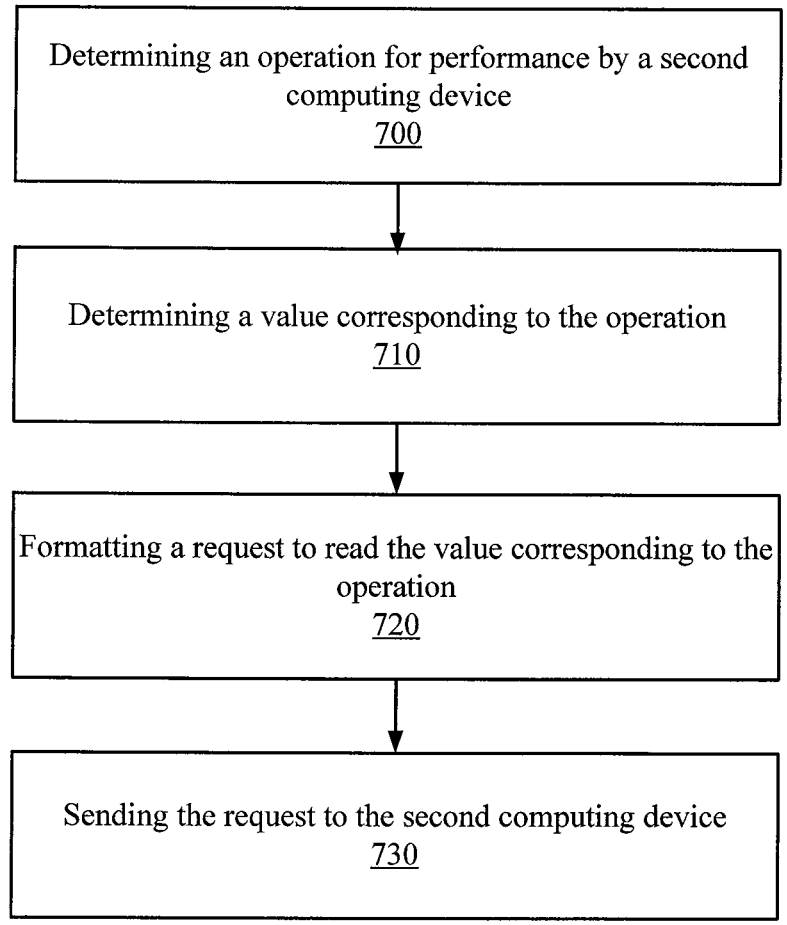
Figure 8:
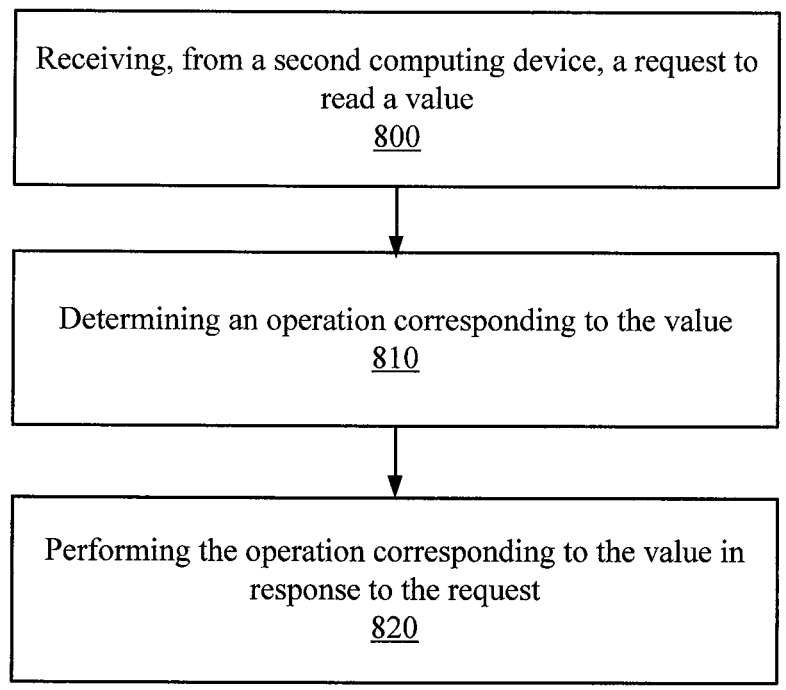

Having thus described the disclosure in the foregoing general terms, reference will now be made to the accompanying drawings, which are not necessarily drawn to scale, and wherein:

FIG. 1 illustrates a side view of an aerosol delivery device in an assembled configuration, the aerosol delivery device having the general configuration of what can be characterized as an electronic cigarette, and comprising a control body and a cartridge according to some example embodiments of the present disclosure;

FIG. 2 illustrates a side view of the cartridge and a section view through the control body of the aerosol delivery device of FIG. 1 wherein the cartridge is decoupled from the control body according to some example embodiments of the present disclosure;

FIG. 3 illustrates an exploded perspective view of the cartridge of FIG. 1, including a base, a control component terminal, an electronic control component, first and second heating terminals, a flow director, a reservoir substrate, an atomizer, an outer body, a mouthpiece, and a label according to some example embodiments of the present disclosure;

FIG. 4 illustrates an example system for controlling operation of a device based on a read request in accordance with some example embodiments of the present disclosure;

FIG. 5 illustrates a block diagram of an apparatus that may be implemented on a computing device that may invoke performance of an operation by a second computing device by sending a read request to the second computing device in accordance with some example embodiments of the present disclosure;

FIG. 6 illustrates a block diagram of an apparatus that may be implemented on a computing device that may perform an operation in response to receiving a read request from a second computing device in accordance with some example embodiments of the present disclosure;

FIG. 7 illustrates a flowchart according to an example method for invoking performance of an operation by a second computing device by sending a read request to the second computing device in accordance with some example embodiments of the present disclosure; and FIG. 8 illustrates a flowchart according to an example method for performing an operation in response to receiving a read request from a second computing device in accordance with some example embodiments of the present disclosure.

DETAILED DESCRIPTION

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Some example embodiments of the present disclosure relate to a system and related methods, apparatuses, and computer program products for controlling operation of a device based on a read request. These example embodiments may provide several advantages over prior techniques. For example, some embodiments provide a finer level of control over devices offering a more limited user interface. As a further example, in some embodiments in which a protocol, such as Bluetooth, may be used to support a read request that may be used to invoke performance of an operation, the protocol's write handlers may not have to be implemented, thereby reducing programming complexity and saving memory space on devices with relatively limited memory space (e.g., limited random access memory space and/or limited program memory), such as some aerosol delivery devices. Further, whereas a command to write a value may have to be sanitized (e.g., checked for out of bounds errors), a read request that may be used to toggle or otherwise modify a value in accordance with various example embodiments may not need to be sanitized. Additionally, using a read request to invoke performance of an operation may allow remote control of a device that may prohibit a remote device from writing to the device due to security concerns. Further, read requests may be simpler and require less time to format and transmit than a write request, which may provide a faster response time to user commands and may reduce power consumption in the device generating and sending the read request compared to power that may be required to send a write request or other explicit command for performing an operation.

Moreover, use of a read request to invoke performance of an operation by a device in accordance with various embodiments disclosed herein may be used without transferring a program instruction(s) or other instruction for storage/installation on a device, thereby offering an additional level of control over devices having limited memory space. Accordingly, in some example embodiments, a first device may invoke performance of an operation by a second device based on a read request without the second device downloading or storing any program or information from the first device.

Some example embodiments relate to invoking performance of an operation by an aerosol delivery device by sending a read request to the aerosol delivery device and to an aerosol delivery device configured to perform an operation in response to receiving such a read request. It will be appreciated, however, that embodiments described with respect to application to an aerosol delivery device are provided by way of example, and not by way of limitation. In this regard, embodiments disclosed herein may be applied mutatis mutandis to devices other than aerosol delivery devices within the scope of the disclosure.

Aerosol delivery devices according to the present disclosure may use electrical energy to heat a material (preferably without combusting the material to any significant degree) to form an inhalable substance; such articles most preferably being sufficiently compact to be considered "hand-held" devices. An aerosol delivery device may provide some or all of the sensations (e.g., inhalation and exhalation rituals, types of tastes or flavors, organoleptic effects, physical feel, use rituals, visual cues such as those provided by visible aerosol, and the like) of smoking a cigarette, cigar, or pipe, without any substantial degree of combustion of any component of that article or device. The aerosol delivery device may not produce smoke in the sense of the aerosol resulting from by-products of combustion or pyrolysis of tobacco, but rather, that the article or device most preferably yields vapors (including vapors within aerosols that can be considered to be visible aerosols that might be considered to be described as smoke-like) resulting from volatilization or vaporization of certain components of the article or device. In highly preferred embodiments, aerosol delivery devices may incorporate tobacco and/or components derived from tobacco. As such, the aerosol delivery device can be characterized as an electronic smoking article such as an electronic cigarette.

Aerosol delivery devices of the present disclosure also can be characterized as being vapor-producing articles or medicament delivery articles. Thus, such articles or devices can be adapted so as to provide one or more substances (e.g., flavors and/or pharmaceutical active ingredients) in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term "aerosol" as used herein is meant to include vapors, gases and aerosols of a form or type suitable for human inhalation, whether or not visible, and whether or not of a form that might be considered to be smoke-like.

In use, aerosol delivery devices of the present disclosure may be subjected to many of the physical actions employed by an individual in using a traditional type of smoking article (e.g., a cigarette, cigar or pipe that is employed by lighting and inhaling tobacco). For example, the user of an aerosol delivery device of the present disclosure can hold that article much like a traditional type of smoking article, draw on one end of that article for inhalation of aerosol produced by that article, take puffs at selected intervals of time, etc.

Smoking articles of the present disclosure generally include a number of components provided within an outer shell or body. The overall design of the outer shell or body can vary, and the format or configuration of the outer body that can define the overall size and shape of the smoking article can vary. Typically, an elongated body resembling the shape of a cigarette or cigar can be a formed from a single, unitary shell; or the elongated body can be formed of two or more separable pieces. For example, a smoking article may comprise an elongated shell or body that can be substantially tubular in shape and, as such, resemble the shape of a conventional cigarette or cigar. In one embodiment, all of the components of the smoking article are contained within one outer body or shell. Alternatively, a smoking article may comprise two or more shells that are joined and are separable. For example, a smoking article may possess at one end a control body comprising a shell containing one or more reusable components (e.g., a rechargeable battery and various electronics for controlling the operation of that article), and at the other end and removably attached thereto a shell containing a disposable portion (e.g., a disposable flavor-containing cartridge). More specific formats, configurations and arrangements of components within the single shell type of unit or within a multi-piece separable shell type of unit will be evident in light of the further disclosure provided herein. Additionally, various smoking article designs and component arrangements can be appreciated upon consideration of the commercially available electronic smoking articles, such as those representative products listed in the background art section of the present disclosure.

Aerosol delivery devices of the present disclosure most preferably comprise some combination of a power source (i.e., an electrical power source), at least one control component (e.g., means for actuating, controlling, regulating and/or ceasing power for heat generation, such as by controlling electrical current flow from the power source to other components of the aerosol delivery device), a heater or heat generation component (e.g., an electrical resistance heating element or component commonly referred to as part of an "atomizer"), and an aerosol precursor composition (e.g., commonly a liquid capable of yielding an aerosol upon application of sufficient heat, such as ingredients commonly referred to as "smoke juice," "e-liquid" and "e-juice"), and a mouthend region or tip for allowing draw upon the aerosol delivery device for aerosol inhalation (e.g., a defined air flow path through the article such that aerosol generated can be withdrawn therefrom upon draw). Exemplary formulations for aerosol precursor materials that may be used according to the present disclosure are described in U.S. Pat. Pub. No. 2013/0008457 to Zheng et al. and U.S. Pat. Pub. No. 2013/0213417 to Chong et al., the disclosures of which are incorporated herein by reference in their entirety. Representative types of aerosol precursor components and formulations also are set forth and characterized in U.S. Pat. No. 7,217,320 to Robinson et al. and U.S. Pat. Pub. Nos. 2013/0008457 to Zheng et al.; 2013/0213417 to Chong et al. and 2014/0060554 to Collett et al., the disclosures of which are incorporated herein by reference. Other aerosol precursors that may be employed include the aerosol precursors that have been incorporated in the VUSE® product by R. J. Reynolds Vapor Company, the BLU™ product by Lorillard Technologies, the MISTIC MENTHOL product by Mistic Ecigs, and the VYPE product by CN Creative Ltd. Also desirable are the so-called "smoke juices" for electronic cigarettes that have been available from Johnson Creek Enterprises LLC.

More specific formats, configurations and arrangements of components within the aerosol delivery device of the present disclosure will be evident in light of the further disclosure provided hereinafter. Additionally, the selection of various aerosol delivery device components can be appreciated upon consideration of the commercially available electronic aerosol delivery devices, such as those representative products listed in the background art section of the present disclosure. Further, the arrangement of the components within the aerosol delivery device can also be appreciated upon consideration of the commercially available electronic aerosol delivery devices, such as those representative products listed in the background art section of the present disclosure.

One example embodiment of an aerosol delivery device 100 according to the present disclosure is illustrated in FIG. 1. As illustrated, the aerosol delivery device 100 may include a control body 200 and a cartridge 300. In this regard, FIG. 1 illustrates the control body 200 and the cartridge 300 respectively in an assembled configuration, wherein the control body and the cartridge are coupled to one another. Various mechanisms may connect the control body 200 to the cartridge 300 to result in a threaded engagement, a press-fit engagement, an interference fit, a magnetic engagement, or the like.

As illustrated in FIG. 2, the control body 200 may comprise a plurality of components. For example, the control body 200 may include a coupler 202, an outer body 204, a flow sensor 210, a control component 212, an electrical power source 216 (e.g., a battery, which may be rechargeable, capacitor, and/or other suitable electrical power source), an indicator 218 (e.g., an LED indicator), and an end cap 222. Various element that may be included in a control body are described in U.S. application Ser. No. 14/193,961 to Worm et al., filed Feb. 28, 2014, which is incorporated herein by reference in its entirety.

FIG. 3 illustrates an embodiment of a cartridge, such as the cartridge 300, in an exploded configuration. As illustrated, the cartridge 300 may comprise a base 302, a control component terminal 304, an electronic control component 306, a flow director 308, an atomizer 310, a reservoir substrate 312, an outer body 314, a mouthpiece 316, a label 318, and first and second heating terminals 320a, 320b according to an example embodiment of the present disclosure. The atomizer 310 may comprise a liquid transport element 322 and a heating element 324. The cartridge may additionally include a base shipping plug engaged with the base and/or a mouthpiece shipping plug engaged with the mouthpiece in order to protect the base and the mouthpiece and prevent entry of contaminants therein prior to use as disclosed, for example, in U.S. patent application Ser. No. 13/841,233 to Depiano et al., filed Mar. 15, 2013. The description included hereinafter provides example configurations of the above-described components and methods of assembly thereof. However, it should be understood that the cartridge 300 may be assembled in a variety of manners and may include additional or fewer components in other embodiments. For example, although the cartridge 300 is generally described herein as including a reservoir substrate, in other embodiments the cartridge may hold an aerosol precursor composition therein without the use of a reservoir substrate (e.g., through use of a container or vessel that stores the aerosol precursor composition or direct storage therein). In some embodiments, an aerosol precursor composition may be within a container or vessel that may also include a porous (e.g., fibrous) material therein.

It will be appreciated that FIGS. 1-3 are provided by way of example, and not by way of limitation. In this regard, other arrangements and configurations of components for forming an aerosol delivery device are contemplated within the scope of disclosure. The various components of an aerosol delivery device according to the present disclosure can be chosen from components described in the art and commercially available.

Having described several example embodiments of aerosol delivery devices that may be used with various example embodiments, several embodiments of a system and related methods, apparatuses, and computer program products for controlling operation of a device based on a read request will now be described. Such example embodiments enable a greater degree of control over devices, such as the aerosol delivery devices described above, that may have a more limited user interface compared to computing devices having fully featured user interfaces.

FIG. 4 illustrates an example system 400 for controlling operation of a device based on a read request in accordance with some example embodiments of the present disclosure. The system 400 may include a plurality of computing devices, including Device A 402 and Device B 404. Device A 402 may be configured to invoke performance of an operation by Device B 404 by sending a read request to Device B 404, as described further herein. Device B 404 may, in turn, be configured to perform an operation in response to a read request received from Device A 402, as described further herein.

Device A 402 and Device B 404 may each be embodied as any computing device that may be configured to communicate with another computing device. In accordance with some example embodiments, Device A 402 may be embodied as a computing device offering a user interface with input/output mechanisms enabling a user to input commands for controlling operation of Device B 404. By way of non-limiting example, Device A 402 may be embodied as a mobile communication device, such as a smart phone, personal digital assistant (PDA), tablet computing device, a portable media device, some combination thereof, or the like. It will be appreciated, however, that Device A 402 may be embodied as a computing device other than a mobile communication device within the scope of the disclosure, including, for example, a personal computer, such as a laptop computer, desktop computer, or the like.

In accordance with some example embodiments, Device B 404 may be embodied as a computing device having relatively reduced user interface features, or that may not have any user interface features, and thus that may only provide users with course-grained control of Device B 404 through direct interaction with Device B 404. Accordingly, use of Device A 402 to provide control inputs for the Device B 404 that may be propagated to the Device B 404 in the form of corresponding read requests in accordance with various embodiments may provide users with finer-grained control of Device B 404. For example, in some embodiments, Device B 404 may be embodied as an aerosol delivery device, such as the various embodiments of aerosol delivery devices described above with respect to FIGS. 1-3. As further examples, in some embodiments, Device B 404 may be embodied as a wearable computing device (e.g., a health monitor, watch, and/or the like), a sensor device, various forms of machine-to-machine (M2M) devices, and/or the like. It will be appreciated, however, that Device B 404 is not limited to embodiment as a computing device offering relatively limited user interface features, and may be embodied as a computing device offering more fully featured user interfaces, such as an aerosol delivery device having user interface features, a mobile communication device, personal computer, and/or the like.

Device A and Device B may be configured to establish a communication link with each other to enable Device A 402 to send a read request in accordance with various embodiments to Device B 404. The communication link may be implemented using any wireless or wireline technology configured to enable communication between two computing devices.

For example, in some embodiments, a Bluetooth technology, such as Bluetooth, Bluetooth Low Energy (also known as Bluetooth Smart and Wibree), and/or the like may be used to implement a wireless communication link between Device A 402 and Device B 404. Further examples of wireless communication technologies that may be supported by Device A 402 and/or Device B 404 and used to implement a wireless communication link between Device A 402 and Device B in accordance with some embodiments may include various wireless personal area network (WPAN) networking technologies, such as Zigbee, wireless Universal Serial Bus (USB), various Institute of Electrical and Electronics Engineers (IEEE) 802.15 technologies, and/or the like; various wireless local area network (WLAN) technologies, such as Wi-Fi direct, various IEEE 802.11 technologies, and/or the like; an Infrared Data Association (IrDA) and/or other infrared (IR) technology; near field communication (NFC); and/or other wireless communication technology that may be used to convey a read request and/or other information between computing devices.

It will be appreciated, however, that embodiments described with respect to use of Bluetooth and other types of wireless communication links between Device A 402 and Device B 404 are described by way of example, and not by way of limitation. In this regard, a wireline communication link, such as a USB link, Firewire link, Thunderbolt link, various serial communication links, and/or the like may be substituted mutatis mutandis for a wireless communication link within the scope of the disclosure.

Device B 404 may be configured to provide one or more readable values that Device A 402 may request to read (e.g., by sending a read request referencing a value to Device B 404). For example, in some embodiments, a readable value may be a value that Device A 402 may request to read, and Device B 404 may respond to the request with the requested value. In this regard, the read request may comprise a query for the readable value to which Device B 404 may respond, and in accordance with some embodiments does not include any transfer of a value or other information to Device B 404 for storage on Device B 404. Three such readable values, Value X 406, Value Y 408, and Value Z 410, are illustrated in FIG. 4 by way of example. However, it will be appreciated that Device B 404 may provide any number of readable values within the scope of the disclosure.

A readable value provided by Device B 404 may be mapped to a corresponding operation, which Device B 404 may be configured to perform in response to receiving a request to read the value from Device A 402. The operation may be any operation other than reading/returning the value. In the example of FIG. 4, Value X 406 may correspond to Other Operation X 412; Value Y 408 may correspond to Other Operation Y 414; and Value Z 410 may correspond to Other Operation Z 416. Thus, for example, if Device A 402 requests to read Value Y 408, Device B 404 may be configured to perform Other Operation Y 414 in response to the read request.

Device B 404 may be configured to maintain mappings between the readable values and corresponding operations so that the appropriate operation may be performed in response to a read request that may be received from Device A 402. For example, in some embodiments, Device B 404 may be configured to implement a hook procedure that may be configured to intercept a request to read a value and invoke the operation corresponding to the value. Thus, for example, given a request to read Value Z 410 that may be received from Device A 402, a hook procedure may be configured to intercept the request to read Value Z 410 and to invoke performance of Other Operation Z 416 in response to the request. In some embodiments using one or more hook procedures, a hook procedure may be implemented within a function that may be used to handle a read request. Thus, for example, a function that may be used to respond to a read request by providing the requested value to Device A 402 may include a hook procedure configured to invoke an operation corresponding to the requested value in parallel to or in lieu of reading and returning the requested value.

As a further example of a mapping that may be maintained by Device B 404, in some embodiments, a readable value may be mapped to a memory location storing a reference to the operation corresponding to the value. For example, in some such embodiments, the memory location may contain a pointer to a memory location of the operation and/or a reference to a function call for invoking the operation. As such, when a request to read a value is received, the reference to the corresponding operation that may be maintained in the memory location mapped to the value may be read and used to invoke performance of the corresponding operation.

In order to invoke performance of a particular operation by Device B 404, Device A 402 may accordingly format and send a request to read the value corresponding to the operation to Device B 404. For example, Device A 402 may request to read Value X 406 to invoke performance of Other Operation X 412, may request to read Value Y 408 to invoke performance of Other Operation Y 414, and/or may request to read Value Z 410 to invoke performance of Other Operation Z 416.

In some example embodiments, a request to read a value may reference a variable that may contain or otherwise reference the value. Thus, for example, a request to read Value X 406 may reference the variable (e.g., "X") referencing Value X 406. In some such embodiments, such as some embodiments in which Bluetooth Low Energy is used to support communication between Device A 102 and Device B 104, readable characteristics may be used by Device B 404 to reference readable values in such a manner. Thus, for example, Device A 402 may request to read Value X 406 in some example embodiments by sending an appropriate Bluetooth protocol request for reading characteristic "X." A request to read a variable in such a manner may be interpreted by Device B 404 and used to perform the corresponding operation.

Additionally or alternatively, in some embodiments, Device A 402 may have knowledge of a memory location (e.g., a memory address) at which a value may be stored by Device B 404. In such embodiments, a request to read a value from Device B 404 may reference the memory location of the value.

Device A 402 of some example embodiments may maintain and/or have access to a mapping that may define a correspondence between operations that may be performed by Device B 404 and respective values and/or variables (e.g., characteristics or the like) referencing the values that may be read to invoke performance of those operations. As such, given an operation that Device A 402 (and/or a user thereof) wants Device B 404 to perform, Device A 402 may use the mapping to determine the value corresponding to the operation and format an appropriate request to read the value corresponding to the operation and send the request to Device B 404 to invoke performance of the operation by Device B 404.

Given an example in which Device A 402 (or a user thereof) wants to invoke performance of Other Operation X 412 by Device B 404, Device A 402 may format a request to read Value X 406 and send the request to Device B 404, as illustrated by operation 420. The request may include a reference a variable (e.g., a characteristic) referencing Value X 406, a reference to a memory location storing Value X 406, and/or other reference to Value 406.

Device B 404 may receive the request and determine that the request is a request to read Value X 406 (e.g., based on a reference to Value X 406 that may be included in the request as described above). Device B 404 may further determine that Other Operation X 412 corresponds to Value X 406 and may perform Other Operation X 412 in response to the request to read Value X 406, as illustrated by operation 430. Device B 404 may use any of the previously described techniques to determine and perform the operation (e.g., Other Operation X 412) that corresponds to Value X 406, including, for example, implementation of a hook procedure configured to intercept a request to read Value X 406 and invoke Other Operation X 412 in response thereto, reading a reference to Other Operation X 412 that may be stored in a memory location mapped to Value X 406, and/or the like.

In some example embodiments Device B 404 may be configured to send a response to the request to read Value X 406 to Device A 402, as illustrated by operation 440. For example, in some embodiments, the response may include the value (e.g., Value X 406) requested to be read by Device A 402 in operation 420. In this regard, Device B 404 may be configured to perform a read procedure for reading and providing Value X 406 in addition to (e.g., in parallel) to Other Operation X 412 in response to a request to read Value X 406 in accordance with some example embodiments, and thus may provide Value X 406 to Device A 402 in response to the request. A response to a read request including the requested value may be handled in accordance with a protocol that may be used for reading a value, such as a response to a request to read a characteristic value in accordance with various Bluetooth protocols. Additionally or alternatively, in some example embodiments, Device B 404 may be configured to respond to the request to read Value X 406 with confirmation that Other Operation X 412 was performed in response to the request.

It will be appreciated that Device B 404 may perform any of a variety of operations in response to a read request. Moreover, the set of operations that may be performed in response to a read request may vary depending on the embodiment of Device B 404, as one type of computing device may be capable of a different set of operations than another computing device (e.g., depending on device capabilities and functional purpose). As such, it will be appreciated that each of Other Operation X 412, Other Operation Y 414, and Other Operation Z 416 may comprise any respective operation that may be performed other than or in addition to read procedure that may be used to respond to a read request by providing the requested value.

In some example embodiments, a read request may be used by Device A 402 to alter a power state of Device B 404. For example, in accordance with some such embodiments, a read request may be used to turn Device B 404 off, turn Device B 404 on, place Device B 404 in a standby or low power mode of operation, switch Device B 404 from a low power or standby mode of operation to a normal power consumption mode, and/or the like.

Additionally or alternatively, in some example embodiments, a read request may be used by Device A 402 to modify a configuration setting of Device B 404. A configuration setting modification that may be modified via a read request in accordance with various embodiments may comprise a modification to any adjustable operating parameter that may relate to operation of Device B 404 and, thus, may vary depending on the embodiment of Device B 404.

As a particular example of a configuration setting that may be modified in some embodiments in which Device B 404 is embodied as an aerosol delivery device, a configuration setting for an element of a user interface of the aerosol delivery device, such as the functionality of an LED and/or other indicator(s) (e.g., the indicator 218) that may be implemented on an aerosol delivery device may be modified. Further non-limiting examples of configuration settings that may be modified via a read request in some embodiments in which Device B 404 is embodied as an aerosol delivery device may include modification of a heating profile configuration, modification of an aerosol precursor composition vaporization setting, modification of a puff control setting, modification of a battery management setting, modification of a haptic feedback configuration, modification of a flavor setting, and/or the like. For example, modification of an aerosol precursor composition vaporization setting may include modification of a configuration defining an amount of aerosol precursor composition that is vaporized per puff, and/or other configuration setting that may relate to the vaporization of aerosol precursor composition. Modification of a puff control setting may, for example, include modification of a number of puffs that are allowed within a period of time and/or for a single smoking session, modification of a minimum interval of time that must elapse between puffs, and/or modification of another setting that may govern device behavior with respect to user puffs. Modification of a battery management setting may, for example, include modification of a configuration relating to charging of a battery or other electrical power source (e.g., electrical power source 216) that may be implemented on an aerosol delivery device and/or a configuration that may regulate consumption of the battery. Modification of a haptic feedback configuration may, for example, include modification of a vibration strength of haptic feedback, activating/deactivating haptic feedback, and/or the like. Modification of a flavor setting may, for example, include modification of the type and/or concentration of a flavor that is vaporized separately or in combination with other aerosol precursor components.

In some example embodiments in which a configuration setting may be modified in response to a request to read a value, the value may specify the configuration setting. For example, a readable value may define a value within a range of possible setting values for a configuration. In accordance with some such embodiments, Device A 402 may be configured to request to read a value defining a configuration setting in order to modify the configuration setting, and Device B 404 may be configured to modify the value (e.g., by overwriting the value with a new value and/or otherwise modifying the stored value) in response to the request so as to modify the configuration setting.

In some example embodiments in which a value may be modified in response to a read request, multiple variables, such as multiple characteristics, may reference the same value. Each respective variable referencing the value may correspond to a different operation that may be performed on the value. For example, a request to read a first variable referencing the value may result in Device B 404 performing a first operation to modify the value (e.g., incrementing the value by 1) and a request to read a second variable referencing the value may result in Device B 404 performing a second operation to modify the value (e.g., decrementing the value by 1).

In some example embodiments, Device A 402 may provide a user interface enabling a user to select an operation to be performed by Device B 404 and/or to control at least some functionality of Device B 404. For example, Device A 402 may be configured to display a graphical user interface that may be provided by an application, such as a mobile app, that may be implemented on Device A 402 in accordance with some example embodiments. The graphical user interface may provide access to a plurality of selectable commands for controlling Device B 404. A user may select a command, such as by touching an appropriate region of a touch screen display, providing a voice command, and/or actuating an appropriate key, button, or other input mechanism that may be provided by Device A 402. Device A 402 may receive an indication of a command selected by the user, and may determine the operation(s) corresponding to the command. Device A 402 may format and send one or more read requests to Device B 404 to invoke performance of one or more commanded operations by Device B 404 in response to the user command.

In some example embodiments, a command that may be selected by a user of Device A 402 may be abstracted at a higher level of granularity than operations that may be performed by Device B 404 to carry out the command. Thus, for example, Device A 402 may resolve a user command into a set of operations that may need to be performed by Device B 404 in order to carry out the command, and may format and send the appropriate read requests to invoke performance of the appropriate set of operations by Device B 404.

FIG. 5 illustrates a block diagram of an apparatus 500 that may be implemented on a computing device, such as Device A 402, that may invoke performance of an operation by a second computing device, such as Device B 404, by sending a read request to the second computing device in accordance with some example embodiments of the present disclosure. It will be appreciated that the components, devices or elements illustrated in and described with respect to FIG. 5 below may not be mandatory and thus some may be omitted in certain embodiments. Additionally, some embodiments may include further or different components, devices or elements beyond those illustrated in and described with respect to FIG. 5.

In some example embodiments, the apparatus 500 may include processing circuitry 510 that is configurable to perform functions in accordance with one or more example embodiments disclosed herein. In this regard, the processing circuitry 510 may be configured to perform and/or control performance of one or more functionalities of apparatus 500 (e.g., functionalities of Device A 402) in accordance with various example embodiments. Thus, the processing circuitry 510 may be configured to perform data processing, application execution and/or other processing and management services according to one or more example embodiments.

In some embodiments, the apparatus 500 or a portion(s) or component(s) thereof, such as the processing circuitry 510, may be implemented via one or more integrated circuits, which may each include one or more chips. The processing circuitry 510 and/or one or more further components of the apparatus 500 may therefore, in some instances, be configured to implement an embodiment on a system on a chip.

In some example embodiments, the processing circuitry 510 may include a processor 512 and, in some embodiments, such as that illustrated in FIG. 5, may further include memory 514. The processing circuitry 510 may be in communication with or otherwise control a communication interface 516, user interface 518, and/or read control module 520.

The processor 512 may be embodied in a variety of forms. For example, the processor 512 may be embodied as various hardware processing means, such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 512 may comprise a plurality of processors. The plurality of processors may be in operative communication with each other and may be collectively configured to perform one or more functionalities of a computing device, such as Device A 402, on which the apparatus 500 may be implemented. In some example embodiments, the processor 512 may be configured to execute instructions that may be stored in the memory 514 and/or that may be otherwise accessible to the processor 512. As such, whether configured by hardware or by a combination of hardware and software, the processor 512 may be capable of performing operations according to various embodiments while being configured accordingly.

In some example embodiments, the memory 514 may include one or more memory devices. Memory 514 may include fixed and/or removable memory devices. In some embodiments, the memory 514 may provide a non-transitory computer-readable storage medium that may store computer program instructions that may be executed by the processor 512. In this regard, the memory 514 may be configured to store information, data, applications, instructions and/or the like for enabling the apparatus 500 to carry out various functions in accordance with one or more example embodiments. In some embodiments, the memory 514 may be in communication with one or more of the processor 512, communication interface 516, user interface 518, and read control module 520 via one or more buses for passing information among components of the apparatus 500.

The apparatus 500 may further include a communication interface 516. The communication interface 516 may be configured to enable a computing device, such as Device A 402, on which the apparatus 500 may be implemented to communicate with one or more further computing devices, such as Device B 404 and/or other device that may be controlled to perform an operation by sending a read request to the device. In this regard, the communication interface 516 may include one or more interface mechanisms for enabling communication with other devices and/or networks. As such, the communication interface 516 may include, for example, an antenna (or multiple antennas) and supporting hardware and/or software for enabling communications with a wireless communication network (e.g., a cellular network, Wi-Fi, WLAN, and/or the like) and/or for supporting a wireless communication link with a second computing device. Thus, for example, the communication interface 516 may be configured to support various wireless communication technologies, such as by way of non-limiting example, various Bluetooth technologies (e.g., including Bluetooth Low Energy and/or regular Bluetooth technologies), Zigbee, wireless USB, various IEEE 802.15 technologies, various IEEE 802.11 technologies, IrDA and/or other IR technology, NFC, and/or other communication technologies that may be used to support wireless communication between two or more computing devices, such as between Device A 402 and Device B 404 as described above. The communication interface 516 may additionally or alternatively include a communication modem, a physical port (e.g., a serial port) for receiving a wireline communication cable, and/or other hardware/software for supporting communication via cable, digital subscriber line (DSL), USB, FireWire, Thunderbolt, Ethernet, one or more optical transmission technologies, and/or other wireline communication technology that may be used to implement a communication link between two or more computing devices, such as between Device A 402 and Device B 404 as described above.

In some example embodiments, the apparatus 500 may include the user interface 518. The user interface 518 may be in communication with the processing circuitry 510 to receive an indication of a user input and/or to provide an audible, visual, mechanical, or other output to a user. As such, the user interface 518 may include, for example, a keyboard, a mouse, a joystick, a display, a touch screen display, a microphone, a speaker, one or more biometric input devices (e.g., a visual or sensorial tracing device that may track body part or eye movements), an accelerometer, a gyroscope, and/or other input/output mechanisms. In embodiments wherein the user interface 518 comprises a touch screen display, the user interface 518 may additionally be configured to detect and/or receive an indication of a touch and/or other movement gesture or other input to the display. The user interface 518 may, for example, be configured to display a graphical user interface that may display one or more selectable commands for controlling a second computing device, such as Device B 404 as described above. The user interface 518 may further provide an input mechanism(s) for enabling the user to select the command, which may accordingly be received by the apparatus 500 via the user interface 518.

The apparatus 500 may further include read control module 520. The read control module 520 may be embodied as various means, such as circuitry, hardware, a computer program product comprising computer readable medium (for example, the memory 514) storing computer readable program instructions executable by a processing device (for example, the processor 512), or some combination thereof. In some embodiments, the processor 512 (or the processing circuitry 510) may include, or otherwise control, the read control module 520. The read control module 520 may be configured to format a request to read a value corresponding to an operation from a second device, such as Device B 404, and send the request to the second device to invoke performance of the operation by the second device, as described above. In some example embodiments in which a user may select a command via the user interface 518, the read control module 520 may be configured to resolve the command into one or more operations for performance by the second device to carry out the command, and may be configured to format and send the appropriate read requests to invoke performance of the one or more operations by the second device.

FIG. 6 illustrates a block diagram of an apparatus 600 that may be implemented on a computing device, such as Device B 404, that may perform an operation in response to receiving a read request from a second computing device, such as Device A 402, in accordance with some example embodiments of the present disclosure. In some example embodiments, apparatus 600 may be implemented on an aerosol delivery device, such as the aerosol delivery device 100. For example, in some such embodiments, the apparatus 600 may be implemented on a control body of an aerosol delivery device, such as the control body 200.

It will be appreciated that the components, devices or elements illustrated in and described with respect to FIG. 6 below may not be mandatory and thus some may be omitted in certain embodiments. Additionally, some embodiments may include further or different components, devices or elements beyond those illustrated in and described with respect to FIG. 6.

In some example embodiments, the apparatus 600 may include processing circuitry 610 that is configurable to perform and/or control performance of functions of a computing device, such as Device B 404, on which the apparatus 600 may be implemented in accordance with one or more example embodiments disclosed herein. Thus, the processing circuitry 610 may be configured to perform data processing, application execution and/or other processing and management services that may be implemented to perform functionality of the aerosol delivery device according to one or more example embodiments.

In some embodiments, the apparatus 600 or a portion(s) or component(s) thereof, such as the processing circuitry 610, may be implemented via one or more integrated circuits, which may each include one or more chips. The processing circuitry 610 and/or one or more further components of the apparatus 600 may therefore, in some instances, be configured to implement an embodiment on a system on a chip.

In some example embodiments, the processing circuitry 610 may include a processor 612 and, in some embodiments, such as that illustrated in FIG. 6, may further include memory 614. The processing circuitry 610 may be in communication with or otherwise control the communication interface 616, user interface 618, and/or read execution module 620.

The processor 612 may be embodied in a variety of forms. For example, the processor 612 may be embodied as various hardware processing means, such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 612 may comprise a plurality of processors. The plurality of processors may be in operative communication with each other and may be collectively configured to perform one or more functionalities of a computing device, such as Device B 404, on which the apparatus 600 may be implemented. In some example embodiments, the processor 612 may be configured to execute instructions that may be stored in the memory 614 and/or that may be otherwise accessible to the processor 612. As such, whether configured by hardware or by a combination of hardware and software, the processor 612 may be capable of performing operations according to various embodiments while being configured accordingly.

In some example embodiments, the memory 614 may include one or more memory devices. Memory 614 may include fixed and/or removable memory devices. In some embodiments, the memory 614 may provide a non-transitory computer-readable storage medium that may store computer program instructions that may be executed by the processor 612. In this regard, the memory 614 may be configured to store information, data, applications, instructions and/or the like for enabling the apparatus 600 to carry out various functions in accordance with one or more example embodiments. In some embodiments, the memory 614 may be in communication with one or more of the processor 612, communication interface 616, user interface 618, and read execution module 620 via one or more buses for passing information among components of the apparatus 600.

The apparatus 600 may further include a communication interface 616. The communication interface 616 may be configured to enable a computing device, such as Device B 404, on which the apparatus 600 may be implemented to communicate with one or more further computing devices, such as Device A 402 and/or other device that may be controlled to perform an operation by sending a read request to the device. In this regard, the communication interface 616 may include one or more interface mechanisms for enabling communication with other devices and/or networks. As such, the communication interface 616 may include, for example, an antenna (or multiple antennas) and supporting hardware and/or software for enabling communications with a wireless communication network (e.g., a cellular network, Wi-Fi, WLAN, and/or the like) and/or for supporting a wireless communication link with a second computing device. Thus, for example, the communication interface 616 may be configured to support various wireless communication technologies, such as by way of non-limiting example, various Bluetooth technologies (e.g., including Bluetooth Low Energy and/or regular Bluetooth technologies), Zigbee, wireless USB, various IEEE 802.15 technologies, various IEEE 802.11 technologies, IrDA and/or other IR technology, NFC, and/or other communication technologies that may be used to support wireless communication between two or more computing devices, such as between Device A 402 and Device B 404 as described above. The communication interface 616 may additionally or alternatively include a communication modem, a physical port (e.g., a serial port) for receiving a wireline communication cable, and/or other hardware/software for supporting communication via cable, digital subscriber line (DSL), USB, FireWire, Thunderbolt, Ethernet, one or more optical transmission technologies, and/or other wireline communication technology that may be used to implement a communication link between two or more computing devices, such as between Device A 402 and Device B 404 as described above.

In some example embodiments, the apparatus 600 may include the user interface 618. However, in some embodiments, one or more aspects of the user interface 618 may not be present, or the user interface 618 may be eliminated entirely. The user interface 618 may be in communication with the processing circuitry 610 to receive an indication of a user input and/or to provide an audible, visual, mechanical, or other output to a user. As such, the user interface 618 may include, for example, a keyboard, a mouse, a joystick, a display, a touch screen display, a microphone, a speaker, one or more biometric input devices (e.g., a visual or sensorial tracing device that may track body part or eye movements), an accelerometer, a gyroscope, and/or other input/output mechanisms. In embodiments wherein the user interface 618 comprises a touch screen display, the user interface 618 may additionally be configured to detect and/or receive an indication of a touch and/or other movement gesture or other input to the display.

In embodiments in which the apparatus 600 may be implemented on an aerosol delivery device, the user interface 618 may, for example, include an input mechanism(s) to enable a user to power the aerosol delivery device on/off, to activate a heating element to generate a vapor or aerosol for inhalation, and/or to otherwise actuate and/or control at least some functionality of an aerosol delivery device. For example, the user interface 618 may include a mouthpiece (e.g., mouthpiece 316), and/or associated puff sensing components (e.g., flow sensor 210), which may enable a user to provide a puff input to an aerosol delivery device. As a further example, the user interface 618 may provide one or more indicators (e.g., indicator 218), such one or more LEDs (e.g., LED 212) that may be used to indicate an operating status of an aerosol delivery device, a charge level of a battery, an amount of aerosol precursor composition remaining in a cartridge, and/or to provide other status information that may be related to operation of an aerosol delivery device to a user. In some example embodiments, the user interface 618 may include a vibrator and/or other haptic feedback device, which may impart a vibration and/or other motion on the aerosol delivery device.

The apparatus 600 may further include read execution module 620. The read execution module 620 may be embodied as various means, such as circuitry, hardware, a computer program product comprising computer readable medium (for example, the memory 614) storing computer readable program instructions executable by a processing device (for example, the processor 612), or some combination thereof. In some embodiments, the processor 612 (or the processing circuitry 610) may include, or otherwise control, the read execution module 620. The read execution module 620 may be configured to perform an operation corresponding to a value referenced in a read request that may be received by a computing device, such as Device B 404, on which the apparatus 600 may be implemented in accordance with various example embodiments disclosed herein.

FIG. 7 illustrates a flowchart according to an example method for invoking performance of an operation by a second computing device by sending a read request to the second computing device in accordance with some example embodiments of the present disclosure. In this regard, FIG. 7 illustrates operations that may be performed by some embodiments of Device A 402 to cause Device B 404 to perform an operation in accordance with various embodiments disclosed herein. Accordingly, one or more elements of the apparatus 500, such as one or more of processing circuitry 510, processor 512, memory 514, communication interface 516, user interface 518, and read control module 520 may, for example, provide means for performing one or more of the operations illustrated in and described with respect to FIG. 7.

Operation 700 may include determining an operation for performance by a second computing device, such as Device B 404. For example, a computing device, such as Device A 402, performing the method of FIG. 7 may be configured to display a graphical user interface providing access to one or more selectable commands for controlling the second computing device. A user may select a command and, in some embodiments, operation 700 may include determine an operation for carrying out the command.

Operation 710 may include determining a value corresponding to the operation. For example, in some embodiments, operation 710 may comprise accessing a mapping between operations and references to the corresponding values, such as variables (e.g., characteristics and/or other variables that may reference a value), memory locations storing the values on the second computing device, and/or other indication that may be used to reference the corresponding value. The value corresponding to the operation (e.g., a reference thereto) may accordingly be determined by looking up the operation determined in operation 700 in the mapping to determine the corresponding value reference.

Operation 720 may include formatting a request to read the value corresponding to the operation. The request may include a reference to the value (e.g., the reference that may be determined in operation 710), such as a characteristic and/or other type of variable referencing the value, a reference to a memory location storing the value, and/or other indication that may enable the second device to determine the value requested to be read. For example, the reference to the value may be included as a parameter to the request.

Operation 730 may include sending the request to the second computing device. The request may be sent via a communication link with the second computing device. In some example embodiments, the communication link may be a wireless communication link, such as may be implemented via a Bluetooth technology. In some example embodiments, the value may also be received from the second computing device in response to the request.

FIG. 8 illustrates a flowchart according to an example method for performing an operation in response to receiving a read request from a second computing device, such as Device A 402, in accordance with some example embodiments of the present disclosure. In this regard, FIG. 8 illustrates operations that may be performed by some embodiments of Device B 404 in response to receiving a read request from Device A 402 in accordance with various embodiments disclosed herein. Accordingly, one or more elements of the apparatus 600, such as one or more of processing circuitry 610, processor 612, memory 614, communication interface 616, user interface 618, and read execution module 620 may, for example, provide means for performing one or more of the operations illustrated in and described with respect to FIG. 8.

Operation 800 may include receiving a request to read a value. The request may be received from a second computing device, such as Device A 402, via a communication link with the second computing device. In some example embodiments, the communication link may be a wireless communication link, such as may be implemented via a Bluetooth technology.

Operation 810 may include determining an operation corresponding to the value. For example, in some embodiments, a hook procedure may be configured to intercept the read request and invoke the operation corresponding to the value. In this regard, in some such embodiments, a request to read the value may trigger a read procedure for reading the value and the hook procedure may be implemented within the read procedure and executed in response to the read procedure such that the corresponding operation may be invoked in response to the read request. As another example, in some embodiments, the value may be mapped to (e.g., stored in) a memory location, which may store a reference to the operation corresponding to the value such that when the value is read, the corresponding operation may be determined Operation 820 may include performing the operation corresponding to the value in response to the request. In some example embodiments, the value may also be returned to the second computing device in response to the request.

It will be understood that each block of the flowcharts in FIGS. 7-8, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which may embody the procedures described herein may be stored by one or more memory devices of a computing device and executed by a processor in the computing device. In some embodiments, the computer program instructions comprising the computer program product(s) which embody the procedures described above may be stored by memory devices of a plurality of computing devices. As will be appreciated, any such computer program product may be implemented on a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s). Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

Moreover, it will be appreciated that the ordering of blocks and corresponding method operations within the flowchart is provided by way of non-limiting example in order to describe operations that may be performed in accordance some example embodiments. In this regard, it will be appreciated that the ordering of blocks and corresponding method operations illustrated in the flowchart is non-limiting, such that the ordering of two or more block illustrated in and described with respect to the flowchart may be changed and/or method operations associated with two or more blocks may be at least partially performed in parallel in accordance with some example embodiments. Further, in some embodiments, one or more blocks and corresponding method operations illustrated in and described with respect to the flowchart may be optional, and may be omitted.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. A method for performing an operation in response to a read request, the method comprising a first computing device:
   receiving a request to read a value, wherein the request is received from a second computing device via a wireless communication link between the first computing device and the second computing device;
   determining an operation corresponding to the value, wherein each of a plurality of readable values corresponds to a different respective operation, wherein a hook procedure is configured to intercept the request, and wherein determining the operation corresponding to the value comprises the hook procedure invoking the operation corresponding to the value; and
   performing the operation corresponding to the value in response to the request.

2. The method of claim 1, wherein the first computing device is an aerosol delivery device, and wherein the second computing device is a mobile communication device.

3. The method of claim 1, wherein the wireless communication link is implemented via a Bluetooth technology.

4. The method of claim 3, wherein the request comprises a request to read a value referenced by a characteristic, and wherein determining the operation corresponding to the value comprises determining an operation corresponding to the characteristic.

5. The method of claim 1, further comprising the first computing device sending the value to the second computing device via the wireless communication link in response to the request.

6. The method of claim 1, wherein the value is mapped to a memory location storing a reference to the operation corresponding to the value, and wherein determining the operation corresponding to the value comprises reading the reference from the memory location.

7. The method of claim 1, wherein the request comprises a reference to a variable referencing the value.

8. The method of claim 1, wherein the request comprises a reference to a memory location storing the value.

9. The method of claim 1, wherein the operation corresponding to the value comprises altering a power state of the first computing device.

10. The method of claim 1, wherein the operation corresponding to the value comprises modifying a configuration setting of the first computing device.

11. The method of claim 10, wherein the first computing device comprises an aerosol delivery device, and wherein modifying the configuration setting comprises modifying one or more of a configuration setting for a light emitting diode (LED) indicator, a haptic feedback configuration, a heating profile configuration, an aerosol precursor composition vaporization setting, a puff control setting, and a battery management setting.

12. The method of claim 10, wherein the value specifies the configuration setting, and wherein modifying the configuration setting comprises modifying the value.

13. An aerosol delivery device comprising processing circuitry configured to cause the aerosol delivery device to at least:
   receive a request to read a value, wherein the request is received from a mobile communication device via a wireless communication link between the aerosol delivery device and the mobile communication device;
   determine an operation corresponding to the value, wherein each of a plurality of readable values corresponds to a different respective operation;
   implement a hook procedure configured to intercept the request and invoke the operation corresponding to the value in response to the request; and
   perform the operation corresponding to the value in response to the request.

14. The aerosol delivery device of claim 13, wherein the wireless communication link is implemented via a Bluetooth technology.

15. The aerosol delivery device of claim 14, wherein the request comprises a request to read a value referenced by a characteristic, and wherein the processing circuitry is configured to cause the aerosol delivery device to determine the operation corresponding to the value at least in part by causing the aerosol delivery device to determine an operation corresponding to the characteristic.

16. The aerosol delivery device of claim 13, wherein the processing circuitry is further configured to cause the aerosol delivery device to send the value to the mobile communication device via the wireless communication link in response to the request.

17. The aerosol delivery device of claim 13, wherein the request comprises a reference to a variable referencing the value.

18. The aerosol delivery device of claim 13, further comprising:
   a memory;

wherein the request comprises a reference to a memory location storing the value within the memory.

19. The aerosol delivery device of claim 13, wherein the operation corresponding to the value comprises altering a power state of the aerosol delivery device.

20. The aerosol delivery device of claim 13, wherein the operation corresponding to the value comprises modifying a configuration setting of the aerosol delivery device.

21. The aerosol delivery device of claim 20, wherein modifying the configuration setting comprises modifying one or more of a configuration setting for a light emitting diode (LED) indicator, a haptic feedback configuration, a heating profile configuration, an aerosol precursor composition vaporization setting, a puff control setting, and a battery management setting.

22. The aerosol delivery device of claim 20, wherein the value specifies the configuration setting, and wherein modifying the configuration setting comprises modifying the value.

23. A method for causing a computing device to perform an operation in response to a read request, the method comprising a first computing device:
   determining an operation for performance by a second computing device;
   determining a value corresponding to the operation, wherein each of a plurality of operations corresponds to a different respective value;
   formatting a request to read the value corresponding to the operation; and
   sending the request to the second computing device via a wireless communication link between the first computing device and the second computing device to cause the second computing device to perform the operation, wherein a hook procedure is configured to intercept the request at the second device and to invoke the operation corresponding to the value.

24. The method of claim 23, wherein the first computing device is a mobile communication device, and wherein the second computing device is an aerosol delivery device.

25. The method of claim 23, wherein the wireless communication link is implemented via a Bluetooth technology.

26. The method of claim 25, wherein the request comprises a request to read a value referenced by a characteristic, and wherein the characteristic corresponds to the operation.

27. The method of claim 23, further comprising the first computing device:
   causing display of a graphical user interface providing access to a plurality of selectable commands for controlling the second computing device; and
   receiving an indication of a selected command;
   wherein determining the operation comprises determining the operation in accordance with the selected command.

28. The method of claim 23, wherein the request comprises one of a reference to a variable referencing the value or a reference to a memory location storing the value.

29. The method of claim 23, wherein the operation corresponding to the value comprises altering a power state of the second computing device.

30. The method of claim 23, wherein the operation corresponding to the value comprises modifying a configuration setting of the second computing device.

31. The method of claim 30, wherein the second computing device comprises an aerosol delivery device, and wherein modifying the configuration setting comprises modifying one or more of a configuration setting for a light emitting diode (LED) indicator, a haptic feedback configuration, a heating profile configuration, an aerosol precursor composition vaporization setting, a puff control setting, and a battery management setting.

32. The method of claim 1, wherein determining the operation includes determining the operation in response to the request to read the value, the operation being other than the first computing device reading the value or returning the value to the second computing device.

* * * * *